(12) United States Patent
Jeong

(10) Patent No.: US 10,543,434 B2
(45) Date of Patent: Jan. 28, 2020

(54) METHOD AND SYSTEM OF INCREASING WATER AND ACID CONDENSATION FROM FLUE GAS

(71) Applicant: Arkansas State University—Jonesboro, State University, AR (US)

(72) Inventor: Kwangkook Jeong, Jonesboro, AR (US)

(73) Assignee: Arkansas State University—Jonesboro, Jonesboro, AR (US)

( * ) Notice: Subject to any disclaimer, the term of this patent is extended or adjusted under 35 U.S.C. 154(b) by 375 days.

(21) Appl. No.: 15/072,050

(22) Filed: Mar. 16, 2016

(65) Prior Publication Data

US 2016/0271517 A1 Sep. 22, 2016

Related U.S. Application Data

(60) Provisional application No. 62/134,427, filed on Mar. 17, 2015.

(51) Int. Cl.
| | |
|---|---|
| *B01D 49/00* | (2006.01) |
| *B01D 39/00* | (2006.01) |
| *B01D 41/00* | (2006.01) |
| *B01D 45/00* | (2006.01) |
| *B01D 46/00* | (2006.01) |
| *B01D 50/00* | (2006.01) |
| *B01D 51/00* | (2006.01) |
| *B01D 5/00* | (2006.01) |
| *B01D 53/00* | (2006.01) |
| *F23J 15/02* | (2006.01) |

(52) U.S. Cl.
CPC .......... *B01D 5/0003* (2013.01); *B01D 5/0051* (2013.01); *B01D 53/002* (2013.01); *F23J 15/02* (2013.01)

(58) Field of Classification Search
None
See application file for complete search history.

(56) References Cited

U.S. PATENT DOCUMENTS

| | | | | |
|---|---|---|---|---|
| 5,607,011 A | * | 3/1997 | Abdelmalek | B01D 53/002 165/104.14 |
| 5,820,830 A | * | 10/1998 | McIlroy | B01D 53/502 422/168 |
| 7,110,906 B2 | * | 9/2006 | Vesel | F28F 27/00 702/130 |

(Continued)

*Primary Examiner* — Amber R Orlando
*Assistant Examiner* — Phillip Y Shao
(74) *Attorney, Agent, or Firm* — Schrantz Law Firm, PLLC; Stephen D. Schrantz

(57) ABSTRACT

The system and method spatially predict the condensation of water and acid from the flue gas in the condensing heat exchanger installed in fossil power plant flue gas treatment system or similar environment. By modifying the operational conditions, the heat exchanger can control rates and areas of condensations. The system and method adjust either the cooling water temperature or the flowrate ratio of flue gas to cooling water to control the condensation rates of water or acids. The system and method also estimate actual coverage areas to apply for anti-corrosive coating onto the tube or duct surfaces to resist corrosion due to acid condensation. The system and method also optimize or customize condensation rates of water and acids in boiler flue gas under operating conditions given at a power plant.

20 Claims, 11 Drawing Sheets

(56) References Cited

U.S. PATENT DOCUMENTS

| | | | |
|---|---|---|---|
| 7,585,476 B2* | 9/2009 | Downs | B01D 53/002 423/210 |
| 8,236,093 B2* | 8/2012 | Taylor | B01D 53/002 60/39.181 |
| 8,382,470 B2* | 2/2013 | Kinnunen | F23C 10/10 110/235 |
| 2009/0211263 A1* | 8/2009 | Coyle | F17C 9/02 62/50.2 |

* cited by examiner

| Tube Bank | Metal | Do [in] | Dr [in] | N [fins/in] | Di [in] | t [fin thickness, in] | Ao [ft²/ft] | Ao/Ai | A [ft²] | Vmax/Vface | Tube Pitch [in] | No. of Tubes |
|---|---|---|---|---|---|---|---|---|---|---|---|---|
| Briggs & Young [21] | Cu | 0.737-0.894 | 0.535-0.625 | 6.25-19.5 | 0.444-0.484 | 0.016-0.0795 | 0.517-0.550 | 3.76-7.45 | 122.5-195.0 | 2.43-3.3 | 0.96-1.08 | 147-165 |
| Lehigh ERC | 316SS | 1.0 | 0.5 | 5 | 0.402 | 0.015 | 0.064 | 6.10 | 30 | 4.75 | 1.06 | 5 |

FIG. 8

METHOD AND SYSTEM OF INCREASING WATER AND ACID CONDENSATION FROM FLUE GAS

CROSS-REFERENCE TO RELATED APPLICATIONS

This application claims priority to and is a continuation in part of U.S. Patent Application No. 62/134,427 entitled "METHOD AND SYSTEM OF INCREASING WATER AND ACID CONDENSATION FROM FLUE GAS" filed on Mar. 17, 2015.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

Field of the Invention

The present invention relates to the use of a condensing heat exchanger system ("CHX") and increasing the condensation of water and acid from flue gas. In one embodiment, the present invention relates to the use of condensing heat exchanger system installed in fossil power plant applications. More particularly, the present invention relates to a method of modelling a CHX system that decreases water consumption, increases energy efficiency, and lowers capital costs associated with fossil power plants. The present invention is also related to reducing the release of acids into the environment through flue gas. The present invention is also related to a system designed according to the model.

The present invention is related to articles entitled "Theoretical prediction of sulfuric acid condensation rates in boiler flue gas" published in the International Journal of Heat and Mass Transfer 55 (2012) 8010-8019; "Modeling of Heat Recovery from a Steam-Gas Mixture in a High-Temperature Sorption Process" published in the AIChE Journal, Vol. 58, No. 1, pages 312-321; "Analytical modeling of water condensation in condensing heat exchanger" published in the International Journal of Heat and Mass Transfer 53 (2010), 2361-2368.

Background of the Invention

Water supply issues are increasing in importance for new and existing power plants because the freshwater supply is limited. For companies considering the development of new thermoelectric power plants, water is a first-order concern. The impacts of water supply depend on the economics of water availability in the region in which the power plant is to be built. As demand for electricity and water increases, many thermoelectric power plants will find it difficult to obtain the large quantities of water needed to maintain operations. Most of the water used in a thermoelectric power plant is used for cooling. There is a need for reducing the amount of fresh water used by power plants because thermoelectric power plants utilize significant quantities of water. For example, a 500 MW power plant that employs a once-through cooling technique uses $4.5 \times 10^4$ m$^3$/h (approximately $45 \times 10^6$ kg/h) of water for cooling and for other process requirements.

Power plant exhaust gases release large amounts of water vapor into the atmosphere. The flue gas is a potential source for obtaining much needed cooling water for a power plant. There is almost 40% moisture (by wet coal mass basis) in lignite coal, which translates to 16% moisture by volume (wet basis) in the flue gas. For example, a 600 MW power plant firing lignite exhausts a flue gas flow rate of $2.7 \times 10^6$ kg/h, which includes a moisture flow rate of $0.43 \times 10^6$ kg/h, or about 16 wt % of the flue gas. In contrast, typical cooling tower evaporation rates for a 600 MW power plant unit are $0.7 \times 10^6$ kg/h.

If a power plant could recover and reuse a portion of this moisture, it could reduce its total cooling water intake requirement. The most practical way to recover water from flue gas is to use a condensing heat exchanger. The power plant could also recover latent heat due to condensation, and sensible heat due to lowering the flue gas exit temperature. Harmful acid gases such as $H_2SO_4$, HCl, and $HNO_3$ can also be condensed by the heat exchanger to prevent these acid gases from entering the atmosphere.

SUMMARY OF THE INVENTION

Condensation of vapors in flue gas is a complicated phenomenon since heat and mass transfer of water vapor and various acids simultaneously occur in the presence of non-condensable gases such as nitrogen and oxygen. Design of a condenser depends on the knowledge and understanding of the heat and mass transfer processes. A computer program for analytical modeling of water and sulfuric acid condensation in a flue gas condensing heat exchanger was developed. In one embodiment, the program was written with MATLAB. Governing equations based on mass and energy balances for water vapor condensation were derived to predict variables such as flue gas exit temperature, cooling water outlet temperature, mole fraction and condensation rates. The equations were solved using an iteration technique with calculations of heat and mass transfer coefficients and physical properties. An experimental study was carried out in order to yield data for validation of modeling results.

To evaluate the performance of a condensing heat exchanger, the term 'condensation efficiency' was defined as the ratio of total mass flow rate of condensed water from the heat exchangers to the incoming mass flow rate of water vapor on the flue gas inlet. Parametric studies for both modeling and experiments were performed to investigate the effects of parameters such as flue gas flow rate, cooling water flow rate, inlet cooling water temperature and tube configurations (bare and finned tubes) on condensation efficiency. Predicted results of water vapor condensation were compared with experimental data for model validation, and this showed agreement between experimental data and predictions to within a few percent. Modeling results for prediction of sulfuric acid vapor concentration in the flue gas were compared with measured data obtained by the controlled condensation method.

Full scale modeling was developed for large scale condensing heat exchangers for application to power plants. The modeling was carried out with varying parameters to investigate the effects on condensation efficiency for condensing heat exchanger for a 625 MWe power plant. One of the most important parameters affecting performance of the pilot and full scale condensing heat exchangers was found to be the ratio of cooling water to flue gas flow rates, since this ratio determines how much heat the cooling water can absorb.

Modeling began with control volume definition, derivations of necessary governing equations, algorithm development, program development and results verification. For verification of results, calculated results were compared with experimental data measured by using a pilot scale condensing heat exchanger. The important factors affecting performance of a condensing heat exchanger were found by parametric studies. An analytical model of a large scale condensing heat exchanger was also developed to predict its performance under the restricted conditions of a power plant such as inlet cooling water temperature and ratio of cooling water to flue gas flow rates, with basic assumptions as follows:

Flow arrangement: countercurrent & cross flow,
Tube configuration: bare & multiple bend tube banks, and
Flue gas from the following fuels: #6 oil, natural gas or coal.

The method and system improves the operation of the condensing heat exchanger. The method and system predicts the amount of condensation under the current operating conditions of the heat exchanger. The heat exchanger controls the amount of condensation that occurs at the heat exchanger. By increasing the cooling effect, the heat exchanger increases the amount of condensation of both water and acid. The system may alert an operator to increase the cooling effect by increasing the flow rate of the coolant. The system may also analyze the costs of increasing the flow rate of the coolant to determine if increasing the flow rate of the coolant is cost effective. In another embodiment, the system may automatically increase the flow rate of the coolant to increase condensation. The system may also decrease the temperature of the coolant to increase condensation at the condensing heat exchanger.

The system and method also predicts the condensation of the acid from the flue gas. Acids, including sulfuric acid, condense on the heat exchanger. To limit the amount of acid released from the flue gas, the system and method may modify the operating conditions of the heat exchanger. If the condensing heat exchanger is not condensing a sufficient amount of acid, an alarm or other alert system may activate a warning to alert an operator that an insufficient amount of acid is condensing at the heat exchanger. The method and system may also increase the flow rate of the coolant to increase condensation of the acid at the heat exchanger. The system may also decrease the temperature of the coolant to increase condensation at the condensing heat exchanger.

The method and system also models the operation of the condensing heat exchanger in the operating conditions of the plant. Such modelling enables the power plant to install the appropriate heat exchanger at the plant. The method and system can inform the user of locations at which the acid will condense on the condensing surfaces of the heat exchanger. The method and system also informs the user of the size of the heat exchanger needed and the load required by the plant.

The amount of acid condensate varies throughout the heat exchanger. To combat the corrosion caused by the sulfuric acid, the surfaces at which the acid condensate occur are treated with an anti-corrosive coating such as a polymer, Teflon, corrosive resistant coating, or other anti-corrosive. However, the acid does not occur on all condensing surfaces of the heat exchanger. The system and method analyzes where acid condensation will occur to determine the locations at which the coating should be applied. By reducing the amount of coating applied, the user can save costs by reducing the amount of coating applied to those condensing surfaces at which acid condensation will not occur.

The method and system also determines the effectiveness of a heat exchanger in a specific operating condition. Such determination enables the plant to install the most effective heat exchanger for the operating conditions. The plant can avoid installing a heat exchanger that will not function properly. The plant can also reduce costs of a heat exchanger that is too large for the plant. Therefore, the method and system determines the heat exchangers designed specifically for the environment in which the heat exchanger will be installed.

It is an object of the present invention to deliver high condensation efficiency of flue gas.

It is an object of the present invention to improve operation of the condensing heat exchanger.

It is an object of the present invention to control the flow rate of the coolant within a condensing heat exchanger to effectively manage condensation of water and acid within the flue gas.

It is an object of the present invention to control the temperature of the coolant within a condensing heat exchanger to effectively manage condensation of water and acid within the flue gas.

It is an object of the present invention to customize heat exchangers for most cost effective operation of the condensing heat exchanger within the power plant.

It is an object of the present invention to apply anti-corrosive coating to the condensing heat exchanger at locations to best resist acid corrosion.

It is an object of the present invention to reduce coating applied to the condensing heat exchanger at locations that the coating will not be effective.

It is an object of the present invention to properly size the heat exchanger for operation within the plant.

It is another object of the present invention to provide analytical modeling of water and sulfuric acid vapor condensation in condensing heat exchangers.

It is an object of the present invention to design a system according to a model.

It is an object of the present invention to spatially predict heat and mass transfer in condensing heat exchanger.

It is another object of the present invention to spatially predict the temperatures of gas, liquid, and tube surface.

It is another object of the present invention to spatially predict phase changes of the gases and liquids, such as condensation and evaporation.

It is another object of the present invention to spatially predict the chemical species.

It is another object of the present invention to spatially predict the presence and amounts of carbon dioxide, nitrogen, oxygen, sulfuric acid, nitric acid, and hydrochloric acid.

It is another object of the present invention to develop a configuration of heat exchangers as determined according to the modelling.

It is another object of the present invention to adjust the conditions of a heat exchanger as determined according to the modelling.

It is another object of the present invention to determine the boundary conditions of a heat exchanger Other objectives will be apparent from the disclosure.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 8 is a table showing a comparison for conditions applied to correlation of one embodiment of the present invention;

DETAILED DESCRIPTION OF THE INVENTION

Water Recovery in Power Plants

Water recovery in power plants is used to separate and regenerate water vapors involved in boiler flue gas into liquid water to save fresh water consumption. Flue gas 106 exhausted from boiler or gas turbine can be a potential source for obtaining the water needed for a power plant since flue gas 106 contains a large amount of water vapor in 6-16 vol %. Moisture can be phase-changed into liquid water and separated from flue gas by using condensation technology. U.S. Department of Energy has supported technology development for a condensing heat exchanger and a transport membrane condenser to apply the flue gas condensation for fossil fuel power plant applications.

Figure 1:
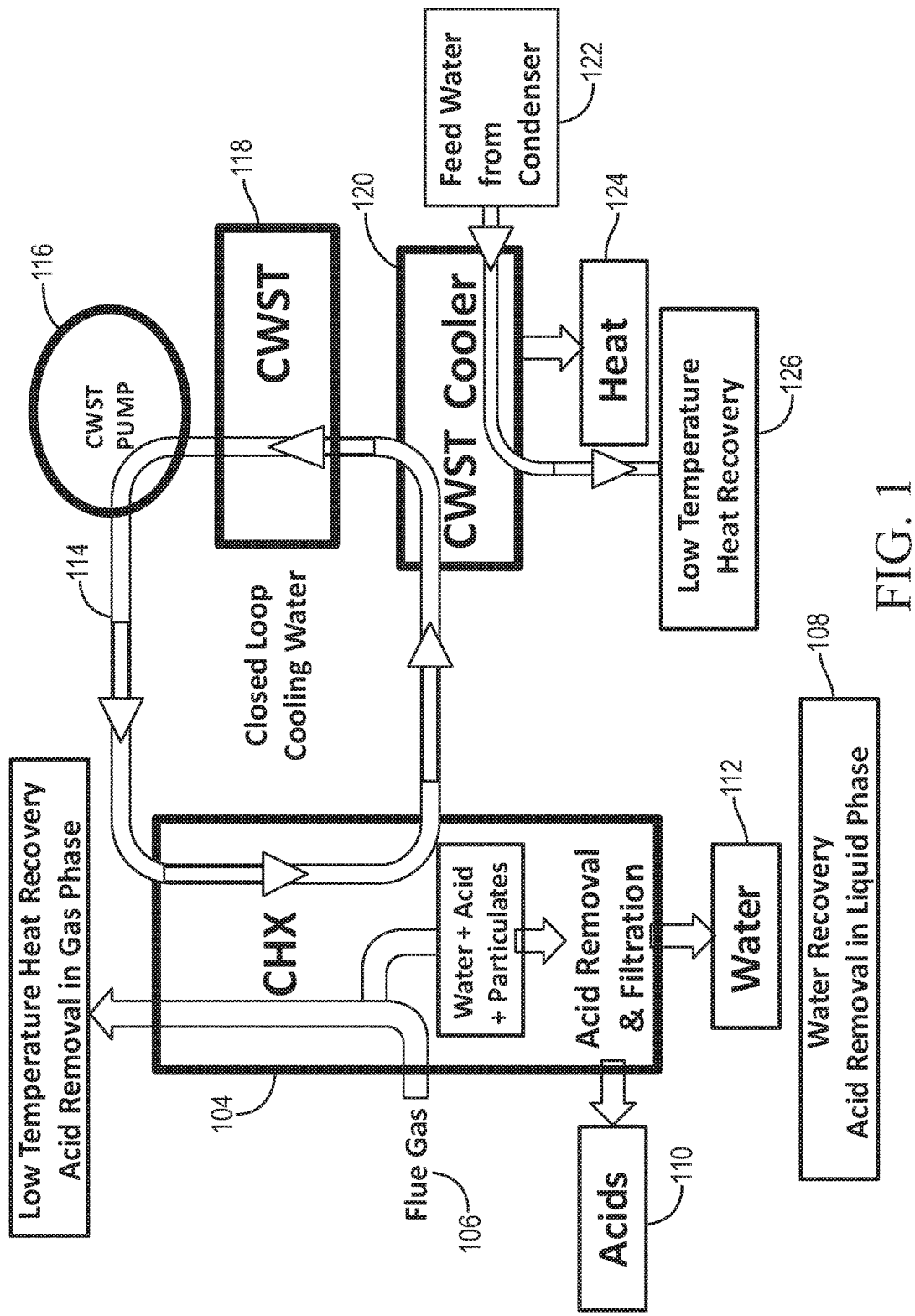
FIG. 1 is an environmental view showing one condensing heat exchanger of the present invention.

In one embodiment, the present invention is an integrated condensing heat exchanger system 100 comprising a condensing heat exchanger (CHX) 104, an acid removal system (ARS) 108, a cooling water storage tank (CWST) 118, a cooler 120, and a pump 116 as shown in FIG. 1. The IRCHX system 100 may be installed at post flue gas treatment system in the power plant. Flue gas 106 ranging 120-200° C. and cooling water ranging 15-37° C. are routed into the shell and tube side of the CHX 104 through the duct inlets, respectively. The boiler exit temperature is set to an industry standard, and averages 200° C. The flue gas 106 may be exhausted from a boiler or from a combustor.

As depicted in FIG. 1, as the CHX 104 cools down flue gas 106, water 112 and minor acid vapors 110 are simultaneously separated from the flue gas 106 in the CHX 104. Condensation efficiency is kept at a set point by controlling the coolant feed rate or coolant temperature from the CWST 118. Film condensation of water vapors occurs on each of the tube surfaces as the tube's surface temperature cools down below the dew point of water vapor in flue gas 106. The condensed water 112 is then separated by density difference and is collected at the bottom of heat exchanger 104. After filtration, acid removal, and/or demineralization, the water is then recycled into appropriate water supplies including without limitation feed water, make-up water for cooling tower, or for use in any other application. ARS alkalizes the acidic water condensates by using a packed-bed reaction system assembled under the CHX (FIG. 1). ARS removes 90% of aqueous acids dissolved in water condensates by using reaction technology, such as neutralization reaction, catalytic reaction, adsorption reaction, or any other comparable reaction technology. After demineralization, recovered water will be utilized for make-up water or other use in power plants. The CWST cooler 120 reduces the raised temperature of coolant water by using feed water from the condenser 122 and routes the cooled water into the CWST 118. The coolant water is recirculated in a closed loop 114 using a CWST 118 and CWST pump 116.

Figure 2:
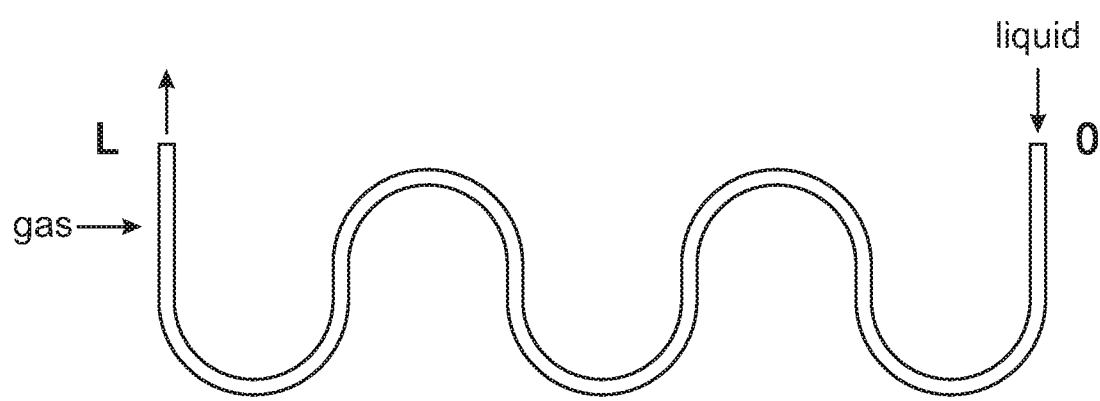
FIG. 2 is a sectional side view of a condensing heat exchanger thereof.
Figure 3:
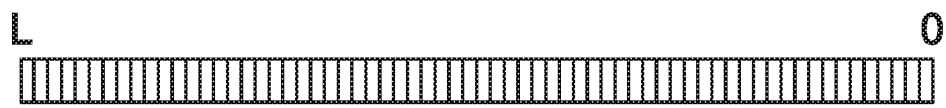
FIG. 3 is a graphical view of one embodiment of the present invention.

To lower the coolant temperature, the CHX 104 is used in connection with an air-cooled condenser by exposing a plurality of u-shaped tube sections 130, 134 with fins 132, 136 out of plane to the duct surface, to immediately take cooling effects with natural convection as shown in FIGS. 2 and 3. As the water passes the finned 132, 136 u-bend tube sections 130, 134, the cooling water temperature drops down to 1~2° C., which reduces interfacial temperature on the tube surface 130, 132, 134, 136 in the CHX 104, followed by lower interfacial mole fraction of water vapor on the bare tube 138, 140 within the CHX 104.

Condensate liquid film made by water condensation tends to behave as a resistance to convective heat and mass transfer because the film temperature is slightly higher than the actual tube surface temperature. The liquid film on the tube surface 130, 132, 134, 136, 138, 140 should be removed as quickly as possible to secure more effective heat transfer areas in the CHX 104 so that the probability density of the colliding water vapors directly into the effective tube surface is maximized. Roughness and friction factors of materials are taken into account in tube selections since surface tension between liquid film and tube surface should be reduced to increase tube surface area uncovered with liquid film.

Considerations for Water Recovery System for Power Plant Applications

In applying the novel condensing heat exchanger ("CHX") system to power plants, the condensation efficiency should be considered and defined as the weight % ratio of total condensation rate to inlet water vapor flow rate. The condensation efficiency is used to evaluate the performance of the condensing heat exchangers. Condensation efficiency ($\eta_{cd}$) is expressed as follows in Equation (1):

$$\eta_{cd}[\text{wt \%}] = \frac{\dot{m}_{cd,tot}}{\dot{m}_{H_2O,in}} \times 100 \qquad \text{Equation (1)}$$

where $\dot{m}_{cd,tot}$ is mass flow rate of water condensates and $\dot{m}_{H2O,in}$ is mass flow rate of water vapor at inlet of the CHX. The mass flow rate of water vapor at the CHX system inlet is obtained from conversion of mole fraction of water vapors at the inlet into mass fraction. The mass flow rate of cooling water is an important factor affecting condensation efficiency since it is related to the heat absorption capacity of the cooling water. However, the mass flow rate of cooling water ($\dot{m}_c$) is more meaningful when known relative to the mass flow rate of wet flue gas at the inlet ($\dot{m}_{g,in}$). Moreover, better condensation efficiencies were expected with higher ratios of cooling water to flue gas flow rates.

Analytical modeling for water vapor and sulfuric acid condensation in condensing heat exchangers was developed for the present invention. The modeling approach is based on conservation of energy and mass for the flue gas and cooling water. Appropriate assumptions and simplifications were applied for pilot scale modeling. All governing equations were solved by using an iterative solution technique. The necessary heat and mass transfer coefficients, and physical properties were calculated with empirical correlations. The computer program was developed using MATLAB R2007a. The program calculated variables for heat and mass transfer of water vapor and sulfuric acid condensation for the pilot scale condensing heat exchanger.

The present invention relates to modeling software that spatially predicts heat and mass transfer in a condensing heat exchanger. The present invention also relates a system designed according to the modelling software. The present invention enables the user to spatially predict the temperatures of the gases, liquids, and tube surfaces of the system. The present invention also enables the user to spatially predict the phase changes, such as condensation and evaporation, of the gases and liquids. The present invention also enables the user to spatially predict the chemical species of the system. The user may then modify the boundary conditions of the system to increase the effectiveness of the heat exchanger system.

Experimentation was carried out to validate the pilot scale model developed. An experimental setup was installed at a Boiler House to carry out the tests for condensation of water vapor and sulfuric acid. Actual flue gas exhausted from boiler was ducted to the pilot scale heat exchanger, where condensation occurred. In the experiments, temperatures of flue gas and cooling water, flow rate of flue gas and cooling water, concentrations of sulfuric acid and oxygen, elapsed time, and amount of condensate were measured. Tests were performed by varying the following parameters: type of flue gas, tube configuration, flue gas flow rate, cooling water flow rate, and cooling water inlet temperature. The concentration of sulfuric acid in the flue gas was measured using the controlled condensation method (CCM), EPA Method 8B. The concentration of sulfate ions in the condensed water which drained from the low temperature heat exchangers was measured in a laboratory using EPA Method 300. The raw data was analyzed using the computer program of the present invention.

The term 'condensation efficiency' was defined to make a quantitative evaluation of the performance of a condensing heat exchanger. This term is the ratio of total mass flow rate of condensed water from all heat exchangers to the mass flow rate of incoming water vapor in the heat exchanger inlet. The ratio of cooling water flow rate to flue gas flow rate is defined as $\dot{m}_c/\dot{m}_{g,in}$ which was the most decisive operating parameter to evaluate the condensation efficiency.

Verification of the water vapor condensation model involved the following steps: mass and energy balance calculations, analysis of non-condensable gas effects, convergence tests, comparisons with results of pilot scale tests, and a parametric study. The pilot scale model showed good agreement with mass and energy balances. The effect of the non-condensable gas fraction was confirmed in a theoretical study. The results of analytical modeling based on the same boundary conditions as the pilot scale tests agreed well with the test results. The average discrepancies based on comparisons between the results of analytical modeling and experiments were less than 5%. The parametric study of the analytical model showed good accuracy under quantitative and qualitative evaluation. It was shown that the one dimensional analytical model for water vapor condensation has good accuracy.

An analysis was conducted to investigate the performance of condensing heat exchangers within the possible ranges of power plant conditions, such as limited ratio of $\dot{m}_c/\dot{m}_{g,in}$ w=0.5 ~1.0, and high inlet cooling water temperatures (70° F.~100° F.). As a result, it was found that heat transferred to the cooling water was limited with low ratios of $\dot{m}_c/\dot{m}_{g,in}$, even though the heat exchangers were operating with a low inlet cooling water temperatures. Condensation efficiency was predicted to range from 10 wt % to 30 wt % as the ratio of $\dot{m}_c/\dot{m}_{g,in}$ varied from 0.5 to 1.0 for a high inlet cooling water temperature (90° F.).

Analytical modeling of sulfuric acid condensation from oil-firing was conducted together with modeling of water vapor condensation. The modeling results were compared with measured data to verify the modeling program. It was shown that both predicted and measured data decreased with a rapid rate during HX2, followed by a limited reduction from HX3 to HX6. The predicted results show 100% mass balance but the test results showed a poor mass balance. It is speculated that while the largest portion of condensed sulfuric acid was deposited onto tube and duct walls at the high temperature end, there was not a sufficiently high condensation rate to transport the condensed sulfuric acid to the bottom of heat exchanger to be collected.

Analytical modeling of sulfuric acid condensation from coal-firing was conducted together with modeling of water vapor condensation. The modeling results were compared with measured data to verify the modeling program. Measured data showed a different trend of sulfuric acid concentration in flue gas from the oil-firing data. It showed differences between predicted and measured data from HX3 to HX6. In the experiment, conservation of mass showed a 51.8 wt % imbalance while modeling result showed a 100 wt % mass balance. It is expected that the discrepancy comes either from the measurement uncertainty at the power plant or from errors in the model for acid condensation.

In developing the analytical model, two discontinuities were found related to the transition to turbulence in the cooling water, and the onset of condensation in the flue gas. These problems were solved using an interpolation and averaging technique. Modification of the numerical procedure made the energy balance satisfactory.

Modeling for a full scale condensing heat exchanger was developed after verification of the pilot scale model. To scale up the model, the scaling effects from the pilot scale to full scale were investigated using data from a commercial heat exchanger company and an actual power plant. Using full scale modeling, condensation efficiency of the full scale condensing heat exchanger was predicted with the scaling effects. A parametric study was conducted with parameters such as heat transfer surface area, upstream velocity, tube diameter, tube transverse pitch, and flow rates. It was shown that the condensing heat exchanger has the largest effectiveness with a given heat transfer area when the flue gas flow rate is equal to cooling water flow rate.

The major discoveries of the present invention are summarized as follows.

A computer program to model the simultaneous condensation of water vapor and sulfuric acid vapor was developed for pilot scale and full scale condensing heat exchangers. The pilot scale model predicted total condensation rates with a discrepancy ranging from 0 to 5%. Numerical instabilities due to turbulent transition in the cooling water and the starting point of condensation were found and eliminated by using interpolation technique of heat transfer coefficients both before and after the critical Reynolds number and taking average mass transfer coefficients from the starting point of condensation.

The reduction rate of sulfuric acid in pilot scale condensing heat exchangers for oil-firing was simulated using analytical modeling. The two trends—steep reduction within high temperature HX and smooth reduction within lower temperature HX—of modeling results are in agreement with experimental data.

Analytical modeling of sulfuric acid condensation from coal-firing was conducted together with modeling of water vapor condensation. Measured data showed a different trend of sulfuric acid concentration in flue gas from the oil-firing data. It showed differences between predicted and measured data from HX3 to HX6. It is expected that the discrepancy comes either from the measurement uncertainty at the power plant or from errors in the model for acid condensation.

The most important operating parameter controlling the performance of condensing heat exchangers was found to be the ratio of cooling water to flue gas flow rates, $\dot{m}_c/\dot{m}_{g,in}$, since it determines how much heat the cooling water can absorb.

The condensation efficiency of a full scale condensing heat exchanger for a 625 MWe power plant was predicted in the range of $\dot{m}_c/\dot{m}_{g,in}$ from 0.5 to 1.0 for heat transfer surface areas ranging from 0 to 260,000 ft$^2$. Effects of design parameters such as tube diameter, upstream velocity, tube transverse pitch, and reduced flow rate were investigated to improve the condensation efficiencies of the full scale system.

The system and method provides for analytical modeling for heat and mass transfer in a condensing heat exchanger. The system and method solves all variables expressed at FIGS. 7A and 7B using an appropriate numerical scheme. The numerical scheme employed is an iterative solution procedure which iterates the loop until reasonable agreement between calculated and target values of variables is obtained.

Assuming a countercurrent and cross flow condensing heat exchanger which has multiple tube bends in the duct. Flue gas flows into the duct and cooling water flows inside the tubes in a direction opposite to the flue gas flow. The schematic for overall control volume of a pilot scale condensing heat exchanger taken into account in this study is illustrated at FIG. 9.

Figure 9:
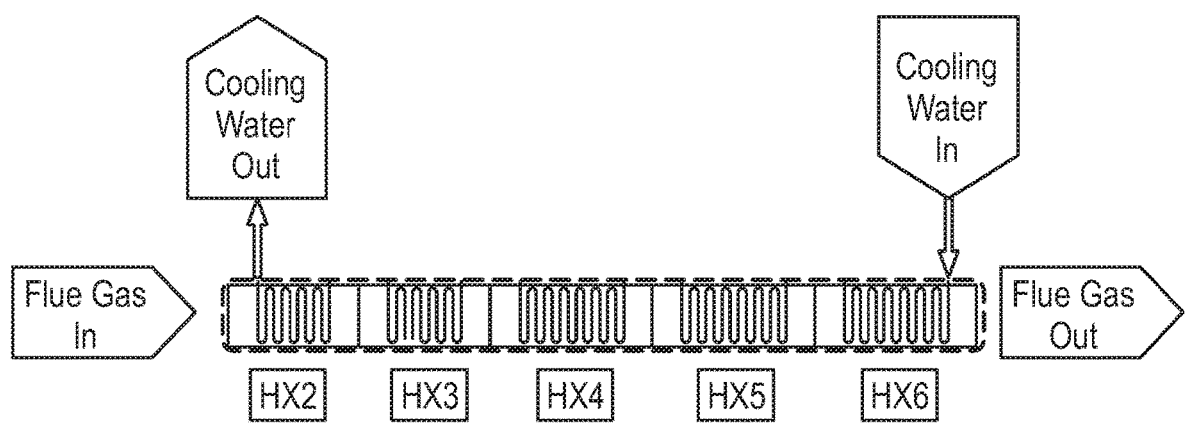
FIG. 9 is a schematic view of a condensing heat exchanger of one embodiment of the present invention.
Figure 10:
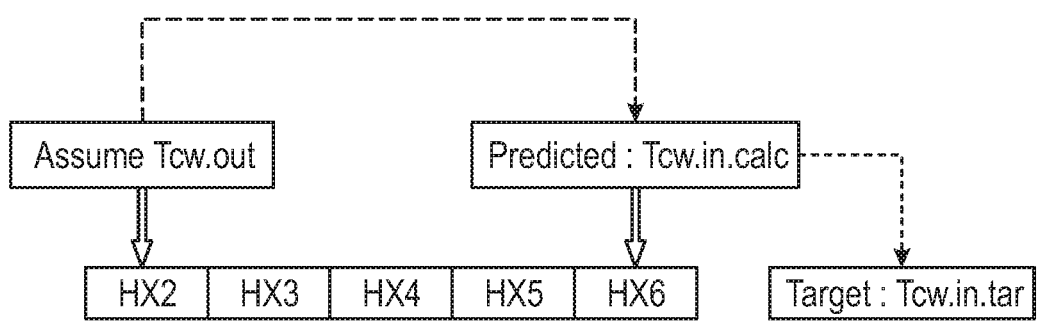
FIG. 10 is a schematic view for an interative solution procedure of one embodiment of the present invention.

As shown in FIG. 9, one configuration provides 5 stages of heat exchangers connected in series. Such a configuration includes several given variables: inlet flue gas temperature, inlet flue gas flow rate, inlet cooling water temperature, cooling water flow rate, and inlet mole fraction of water vapor. A simplified numerical scheme for modeling the condensing heat exchanger shown is illustrated at FIG. 10.

The system and method of the present invention proposes that the given inlet cooling water temperature is fixed as a target value and serves as the criterion for convergence. In order to calculate inlet cooling water temperature, a value for the exit cooling water temperature is initially assumed on the flue gas inlet side. The control volume is discretized with piecewise cells for a one dimensional finite difference method.

The solution procedure consists of an inner loop for calculations of necessary variables and an outer loop for iteration control. The inner loop begins with assumption of exit cooling water temperature and calculates variables such as the unknown temperatures and the heat and mass transfer coefficients of each cell. After one iteration of the inner loop, the calculated inlet cooling water temperature at the last cell is compared with the target value which is a given inlet cooling water temperature. If it does not coincide, the outer loop adjusts and updates the exit cooling water temperature. The inner loop is started over with the newly assumed value of exit cooling water temperature. The outer loop iterates until the calculated inlet cooling water temperature coincides with the target value within reasonable accuracy.

Figure 11:
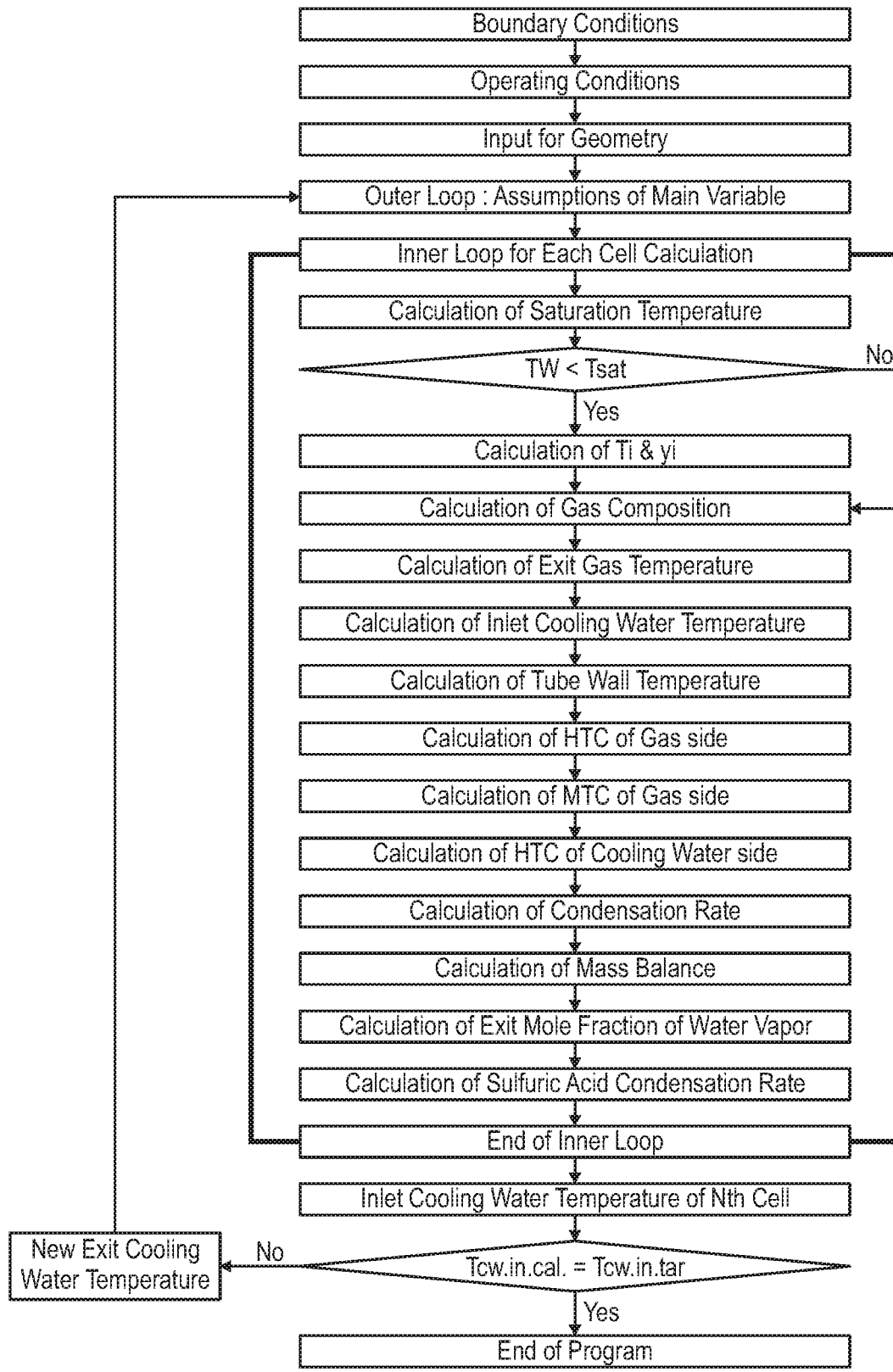
FIG. 11 is a flow chart showing an iterative solution procedure of one embodiment of the present invention.

For better confidence level, total condensation rate is added to the convergence criteria. In this case, iteration of the solution procedure is terminated only when both the inlet cooling water temperature and total condensation rate converge within an acceptable range. FIG. 11 shows the detailed logic for the iterative solution procedure.

In discretizing the total heat transfer surface area to apply a one dimensional finite difference method, forward differencing was used. The trapezoidal rule was applied for numerical integration.

The present invention provides for a modeling system that enables spatial prediction of heat and mass transfer in a condensing heat exchanger. The system predicts both ash deposition and acid deposition. The acid deposition occurs at two lower temperatures. The system considers energy balance equation and mass balance for its predictions. As discussed above, the present invention spatially predicts the temperatures of the gases, liquids, and tube surfaces of the system. The present invention also enables the user to spatially predict the phase changes, such as condensation and evaporation, of the gases and liquids. The present invention also enables the user to spatially predict the chemical species of the system. The spatial predictions may include the presence and amounts of carbon dioxide, nitrogen, oxygen, sulfuric acid, nitric acid, and hydrochloric acid.

When modeling, the system accepts different geometry and boundary conditions on which to spatially predict the different criteria. Such geometry conditions may include the bends of the tubes, the number of tubes, and alignment of the tubes. The system may also consider the tube configuration and the tube arrangement when modeling the system.

The model may also consider inlet conditions such as the inlet of the liquid of the heat exchanger and the outlet. The model may also consider the intake conditions of the gas and the exhaust of the gas through the heat exchanger as shown in FIG. 2. The system may detect the temperature of the gas, contents of the gas, the condensation point of the gas, throughout the entire space shown in FIG. 2.

Continuing to refer to FIG. 2, the conduit/tube has a length of L. The system may predict the temperature of the liquid that flows through the conduit/tub. The temperature is displayed according to the length of the tube as shown in FIG. 3. The present invention breaks the tube into different section lengths when considering the conditions within the tube as shown in FIG. 3.

Analytical Modeling

Condensation in the Presence of Non-Condensable Gas

Condensation occurs when the temperature of a vapor is reduced to below its saturation temperature. In industrial equipment, the process commonly results from contact between vapor and a cool surface. The latent energy of the vapor is released and heat is transferred to the surface, as the condensates are formed.

The form of condensation typically analyzed is one in which a liquid film covers the entire condensing surface. Under the action of gravity, the film flows continuously along the surface. Generally, condenser design calculations are often based on the assumption of film condensation.

Many engineering applications have the condensation process in the presence of a non-condensable gas. As a result of the mass flow of vapor toward the surface by condensation, non-condensable gas tends to be more concentrated near the cold surface. Concentrated non-condensable gas near the wall acts as a resistance to mass transfer.

Figure 4:
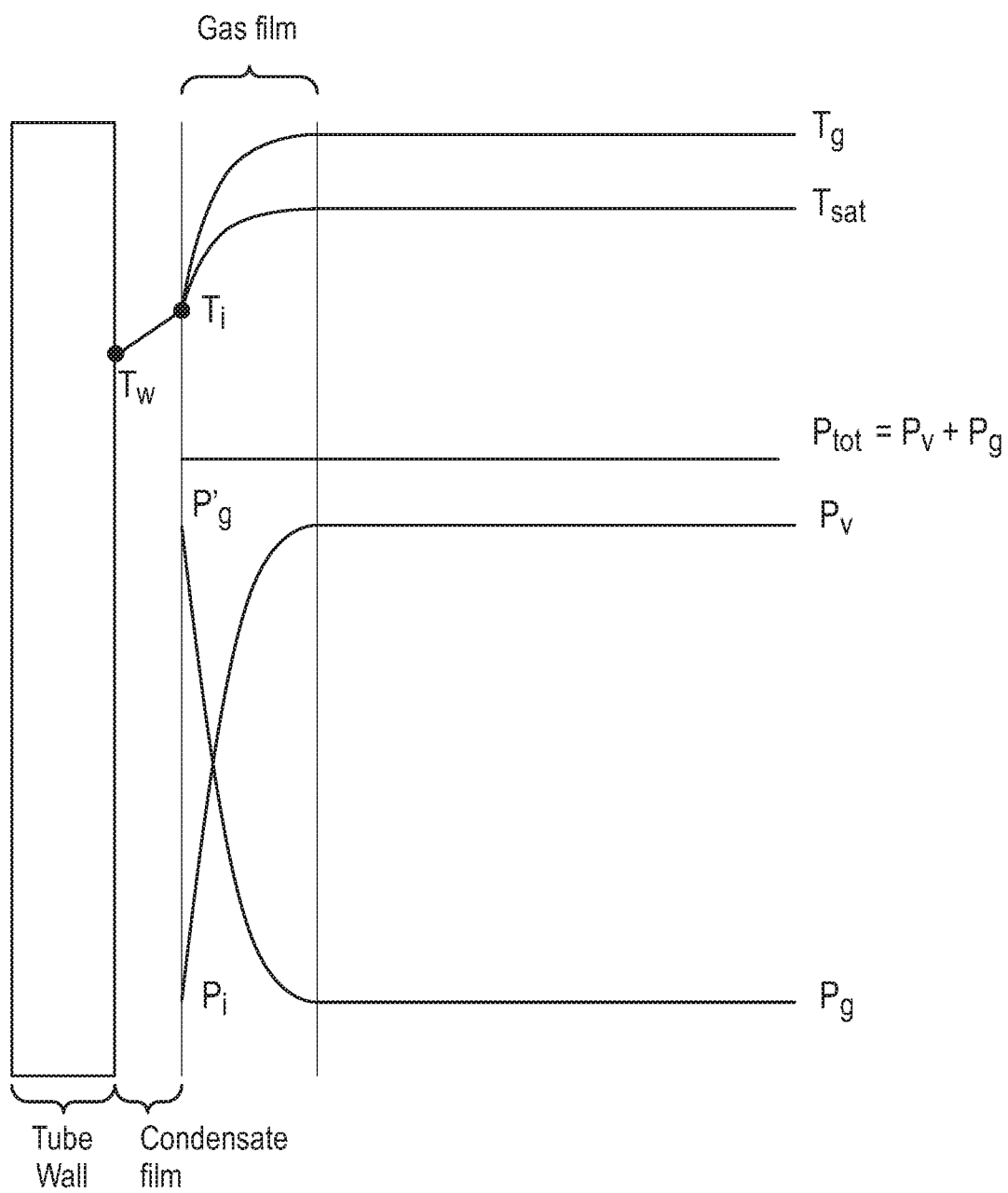
FIG. 4 is a graphical view showing condensation in the presence of non-condensable gas of one embodiment of the present invention.

When a mixture of a vapor and a non-condensable gas is fed to a condenser and the temperature of the tube wall is below the dew point, a film of condensate forms on the tube wall. The relationship between the partial pressure and temperature is shown in FIG. 4.

Total pressure, $P_{tot}$, is sum of partial pressure of water vapor, $P_v$, and partial pressure of non-condensable gas, $P_g$. If equilibrium is presumed to exist on the surface of the condensate film, the partial pressure of the vapor at the tube wall corresponds to $P_i$ at the cold condensate film which is called partial pressure of vapor at the interface. $P'_g$ is partial pressure of non-condensable at the surface of condensate film. $T_g$ is temperature of inert gas and $T_{sat}$ is saturation temperature of vapor corresponding to partial pressure of vapor, $P_v$. $T_i$ is interfacial temperature which is the saturation temperature corresponding to water vapor partial pressure at the surface of condensate film, $P_i$. $T_w$ is the surface temperature of the tube wall. There is a partial pressure difference promoting diffusion while heat is transferred due to the temperature difference between the gas temperature $T_g$ and the condensate film temperature $T_i$. A region in which a difference of both partial pressure and temperature exists between liquid film and gas is called gas film.

In the presence of non-condensable gases, the rate of mass transfer decreases as non-condensable gas concentration increases. As a result of the mass flow of vapor toward the surface by condensation, non-condensable gas tends to be more concentrated near the cold surface. Concentrated non-condensable gases near the wall behave as a resistance to mass transfer, and thus it is more difficult to transport vapors to the wall.

In the pure vapor condensation, temperature and concentrations are the same as in the bulk and at the vapor-condensate interface. In the presence of non-condensable gases, the non-condensing gas is concentrated towards the two-phase interface. The vapor must diffuse through these gas layers in order to reach the cooled condensing surface. This diffusion causes a large concentration difference of vapor compared to the bulk and it leads to a low saturation temperature at the phase interface. Thus, the temperature difference between the wall and the phase interface is reduced by the presence of non-condensable gas and subsequently heat transfer to the cooling surface is also reduced.

Figure 5:
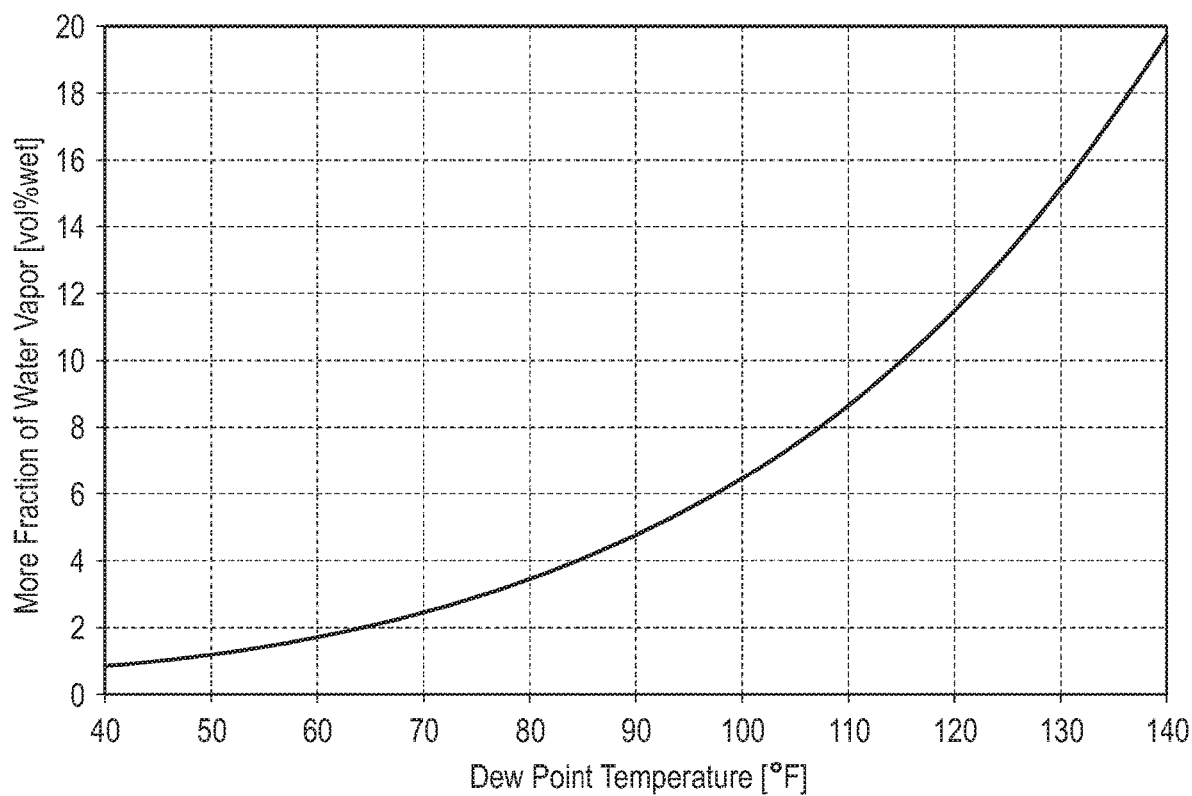
FIG. 5 is a graphical view showing dew point temperature of water vapor in the presence of non-condensable gas of one embodiment of the present invention.

The main objective of this study was to develop an analytical model for heat and mass transfer of water vapor and sulfuric acid condensation in flue gas. In general, all the components in flue gas except vapors of water and acid behave as non-condensable gases. FIG. 5 shows the dew point temperature of water vapor as a function of mole fraction of water vapor in the presence of non-condensable gas. It is shown that the dew point temperature increases as the mole fraction of water vapor increases.

Figure 6:
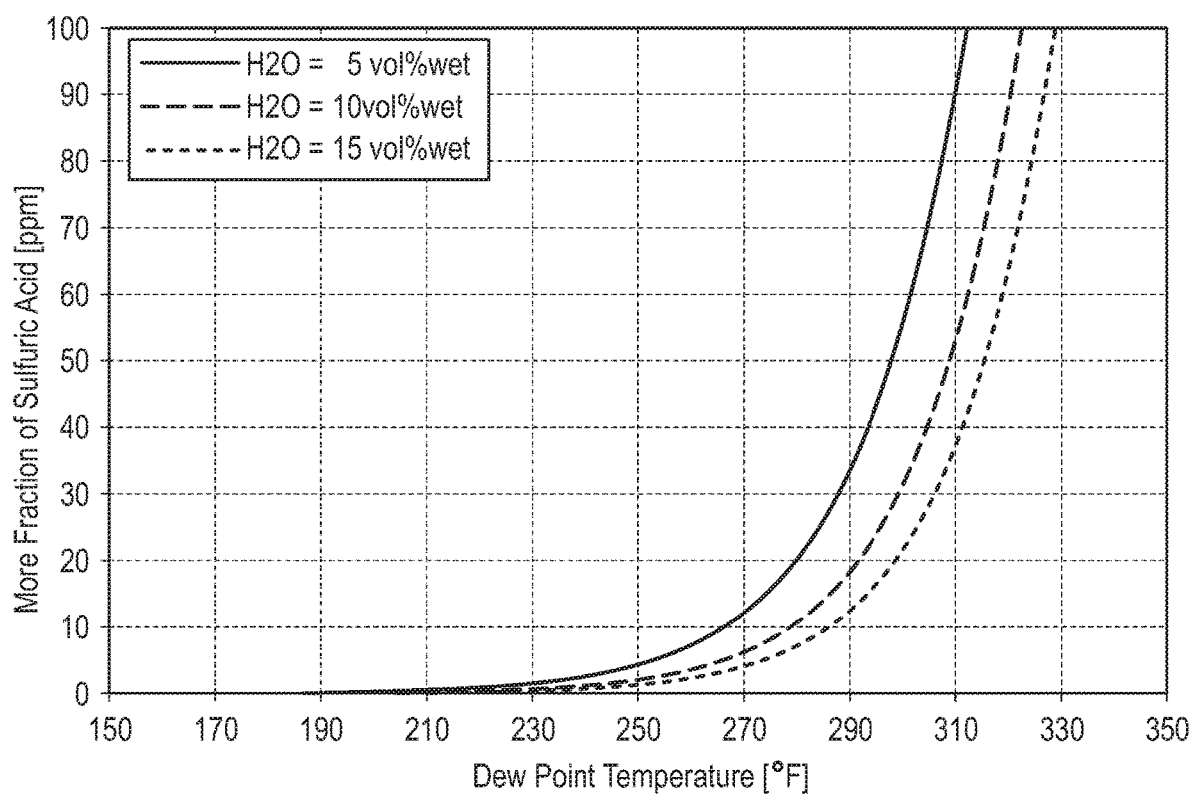
FIG. 6 is a graphical view showing dew point temperature of sulfuric acid in the presence of non-condensable gas of one embodiment of the present invention.

Sulfuric acid vapor condenses out of combustion gas when the temperature of the gas is dropped below its dew point. The condensation mechanism of sulfuric acid is similar to that of water vapor, so the acid condensation is also affected from the presence of non-condensable gases. Flue gas just after an air pre-heater (APH) in a coal-fired boiler can contain concentrations of sulfuric acid ($H_2SO_4$) ranging up to 50 ppm with acid dew points in the 230 to 315° F. range. FIG. 6 illustrates the dew point temperature of sulfuric acid having water vapor concentrations ranging from 5 to 15 vol % wet. Sulfuric acid dew point temperature is a function of water vapor and $H_2SO_4$ concentrations, and it increases as both variables increase.

Control Volume and Variables

The control volume used for analytical modeling is inside a condensing heat exchanger with flue gas flowing outside and cooling water inside. A countercurrent cross-flow heat exchanger is presumed.

Figure 7A:
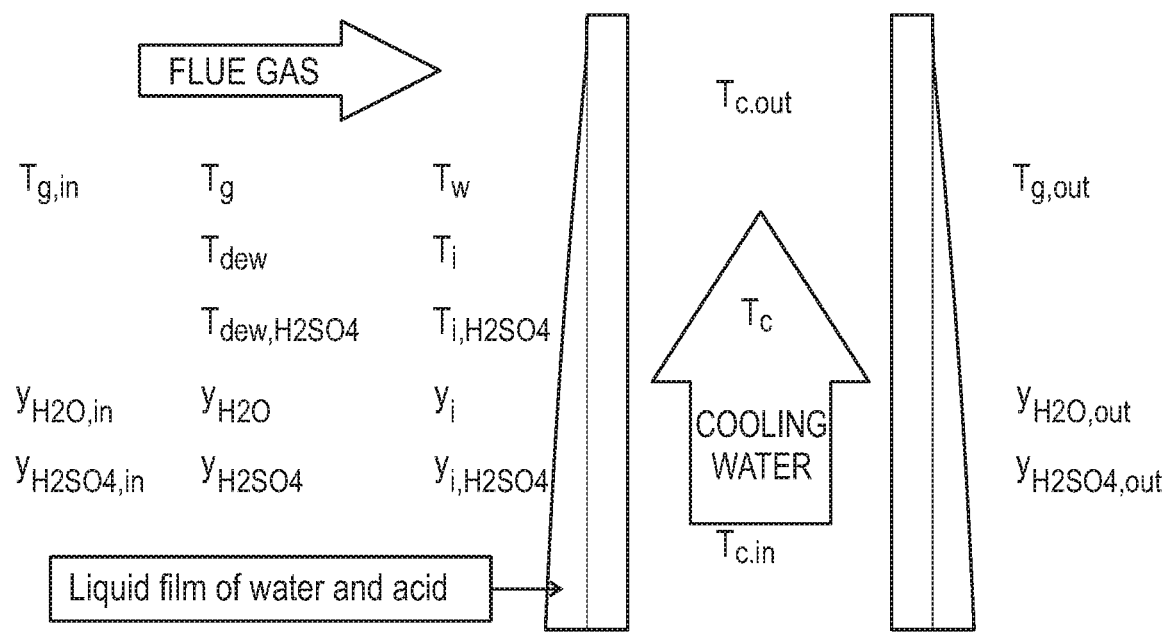
FIG. 7A is a modeling view of the independent variables of one embodiment of the present invention.
Figure 7B:
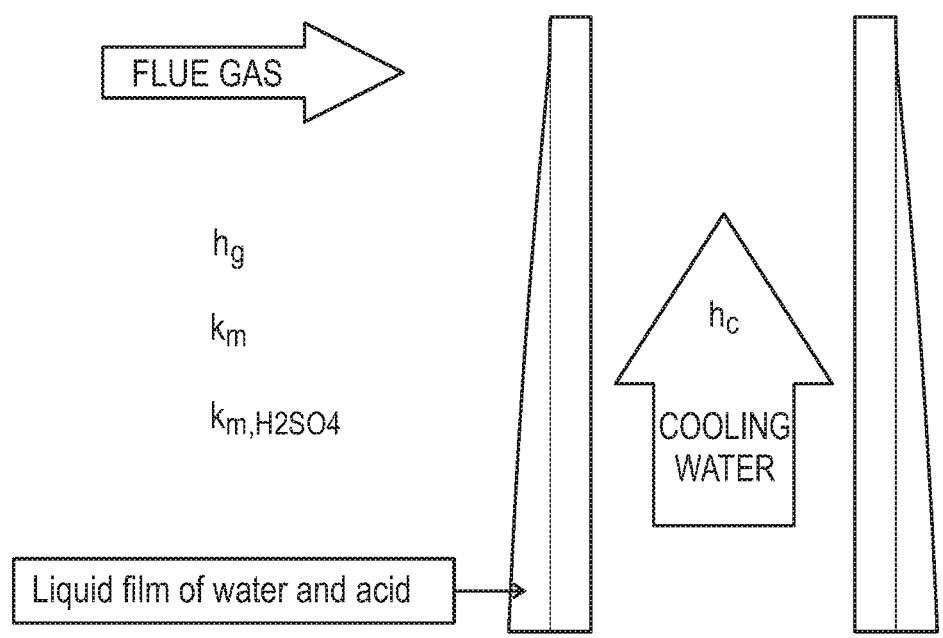
FIG. 7B is a modeling view of the dependent variables of one embodiment of the present invention.

FIGS. 7A and 7B show a control volume to take into account both water vapor and sulfuric acid condensation. FIGS. 7A and 7B show independent and dependent variables defined in the control volume, respectively. Heat and mass transfer for condensation of water and sulfuric acid vapors are considered with this control volume. The flue gas temperatures at the inlet and outlet of this control volume is expressed as $T_{g,in}$ and $T_{g,out}$, respectively. The parameters $T_{c,in}$ and $T_{c,out}$ are the cooling water temperatures at the inlet and outlet, respectively. Tube wall temperature is expressed by $T_w$. The parameters $T_g$ and $T_c$ are average values of flue gas and cooling water temperatures between the inlet and outlet, respectively. Heat transfer in this control volume is controlled by heat transfer coefficients on the flue gas side ($h_g$) and cooling water side ($h_c$).

Sulfuric acid begins condensing earlier than water vapor, where local tube wall temperatures are greater than the water vapor dew point and less than the sulfuric acid dew point. The mole fractions of sulfuric acid vapor at the inlet and outlet of the control volume are expressed as $y_{H2SO4,in}$ and $y_{H2SO4,out}$, respectively. The parameter $y_{H2SO4}$ is the average mole fraction of sulfuric acid vapor between the inlet and outlet. The mass transfer coefficient for sulfuric acid in the flue gas is $k_{m,H2SO4}$. The dew point temperature of sulfuric acid, $T_{dew,H2SO4}$, is represented as a function of partial pressures of water vapor and sulfuric acid in the flue gas.

Water vapor condenses where the tube wall temperature is lower than the dew point temperature of water vapor, while sulfuric acid is being condensed as well. The mass transfer coefficients for both water condensation, $k_{m,H2O}$, and sulfuric acid condensation $k_{m,H2SO4}$, exist when both vapors condense. The mole fraction of water vapor at the inlet and outlet are expressed as $y_{H2O,in}$ and $y_{H2O,out}$, respectively. The parameter $y_{H2O}$ is an average mole fraction of $y_{H2O,in}$ and $y_{H2O,out}$. The dew point temperature of water vapor, $T_{dew}$, is a saturation temperature corresponding to the partial pressure of water vapor in the flue gas. $T_i$ is an interfacial temperature of water vapor corresponding to the surface temperature of the liquid film at the interface between the gas phase and liquid phase.

Both sulfuric acid condensation and water vapor condensation are considered for analytical modeling. While latent heat is released by condensation of sulfuric acid, the amount of this condensation heat flux is negligibly small. Therefore, the latent heat transfer by sulfuric acid condensation is not taken into account.

Water is condensed on the tube surface if the wall temperature is lowered below the dew point of the water vapor. At the same time, latent heat is released in the process of water vapor condensation and is transmitted into the cooling water side. Two-phase flow is assumed at flue gas side, which consists of the gas phase (uncondensed flue gas) and liquid phase (condensates as a mixture of water and sulfuric acid) while single phase flow is assumed on the cooling water side. In this control volume, the condensates of water vapor and sulfuric acid are mixed together in the liquid film on the tube wall. As a result, the mole fractions of both water and sulfuric acid should be calculated in the gas phase as well as in the liquid phase.

Governing Equations and Assumptions

All necessary governing equations for analytical modeling are derived below. The derivation of the governing energy equation for acid condensation is not needed since heat transfer effects of sulfuric acid condensation are neglected.

The Colburn-Hougen Equation

In 1934, Colburn and Hougen developed a fundamental transport equation for condensation in the presence of a non-condensable gas. When the wall temperature is lower than the dew point temperature, water condensation occurs as a result of diffusion of water vapor through the flue gas to the liquid-vapor interface. Therefore, water vapor exists in the flue gas as a superheated vapor at $T_g$ relative to its condensation film temperature $T_i$. There is also a sensible heat flow through the gas to the liquid-vapor interface, in addition to the latent heat of condensation at the interface. The heat transfer to the cooling water is the sum of sensible and latent heat terms. The Colburn-Hougen equation is defined as follows.

$$h_g(T_g-T_i)+k_m \cdot h_{fg}(y_{H_2O}-y_i)=U_o(T_i-T_c) \quad (3.1)$$

Equation (3.1) includes the interfacial temperature for the case of water vapor condensation. The term $h_g$ is the heat transfer coefficient of wet flue gas side and $T_g$ and $T_i$ in the sensible heat transfer term are the temperatures of the bulk flue gas and interface, respectively. The parameters $k_m$ and $h_{fg}$ are the mass transfer coefficient and the latent heat of water vapor, respectively. The parameters $y_{H_2O}$ and $y_i$ are the mole fraction of water vapor in the flue gas and interface, respectively. The overall heat transfer coefficient, $U_o$, is expressed in terms of associated heat transfer coefficients as shown below:

$$\frac{1}{U_o A_{eff}} = \left[\frac{1}{h_c} + R_{fi}\right]\frac{1}{A_i} + R_w + \frac{1}{h_f \cdot A_{eff}} \quad (3.2)$$

where $A_{eff}$ and $A_i$ are the heat transfer areas based on the tube outer diameter including film thickness and the inner diameter of tube, respectively. $R_{fi}$ is the fouling factor at the inside tube. $R_w$ is the conductance resistance of the tube wall which is expressed as $$\frac{\ln(D_O/D_i)}{2\pi k_w L}.$$

The parameters $h_c$ and $h_f$ are the heat transfer coefficient on the cooling water and liquid film, respectively.

In this system and method, the fouling factor and the tube wall resistance are assumed to be negligible. The thermal resistance due to the condensate film is negligible since it contributes only about 1-3% percent of the total thermal resistance. Film thickness is neglected in this system and method, and subsequently $A_{eff}$ is replaced by $A_o$ (the heat transfer area based on the tube outer diameter). Equation (3.3) is derived by above assumptions.

$$\frac{1}{U_o A_o} = \frac{1}{h_c \cdot A_i} \quad (3.3)$$

In Equation (3.3), by neglecting the tube thickness, the terms of heat transfer surface area on both sides are canceled as $A_o \cong A_i$. Using these approximations, the first governing equation is established as shown in Equation (3.4).

$$h_g(T_g-T_i)+k_m \cdot h_{fg}(y_{H_2O}-y_i)=h_c(T_i-T_c) \quad (3.4)$$

Using Equation (3.4), an expression to solve for the interfacial temperature of water vapor can be derived, as follows.

$$T_i = \frac{h_g \cdot T_g + h_{fg} \cdot k_m \cdot (y_{H_2O} - y_i) + h_c \cdot T_c}{h_g + h_c} \quad (3.5)$$

Unknown variables at the right hand side of Equation (3.5) can be solved by other governing equations derived herein. This relationship can be used only if the wall temperature becomes lower than the dew point temperatures of water vapor, namely, water vapor is condensed, such as the case of the control volume assumed in FIGS. 7A and 7B.

Flue Gas Energy Balance Equations

It is assumed that cooling of the flue gas is only based on sensible heat transfer from the flue gas to the liquid film, and it is also assumed that heat released by condensation is transferred to the cooling water. The second governing equation is established by Equation (3.6), as follows.

$$\dot{m}_g \cdot c_{p,g} \cdot dT = h_g \cdot (T_g - T_i) \cdot dA \quad (3.6)$$

Equation (3.6) is based on the energy balance between the enthalpy change of flue gas side and the heat transfer rate from the flue gas to the liquid film. This ordinary differential equation, Equation (3.6) is integrated for a discretized cell, which is presumably small enough to assume that all other variables are constant.

$$\int_{T_{g,in}}^{T_{g,out}} \dot{m}_g \cdot c_{p,g} \cdot dT = \int h_g \cdot (T_g - T_i) \cdot dA$$

$$\dot{m}_g \cdot c_{p,g} \int_{T_{g,in}}^{T_{g,out}} dT = h_g \cdot (T_g - T_i) \cdot \int dA$$

$$\dot{m}_g \cdot c_{p,g} \cdot (T_{g,out} - T_{g,in}) = h_g \cdot (T_g - T_i) \cdot \Delta A_i$$

Using the relation that the parameter $T_g$ is an average value of $T_{g,in}$ and $T_{g,out}$, the above equation can be expressed.

$$\dot{m}_g \cdot c_{p,g} \cdot (T_{g,out} - T_{g,in}) = h_g \cdot \left(\frac{T_{g,in} + T_{g,out}}{2} - T_i\right) \cdot \Delta A_i$$

An expression to calculate the exit flue gas temperature in a discretized cell can be obtained as follows.

$$T_{g,out} = \frac{\left(\dot{m}_g - \frac{h_g}{2} \cdot \Delta A_i\right) \cdot T_{g,in} + h_g \cdot \Delta A_i \cdot T_i}{\dot{m}_g \cdot c_{p,g} + \frac{h_g}{2} \cdot \Delta A_i} \quad (3.7)$$

Equation (3.7) can be used to calculate the exit gas temperature for the cell in the presence of water vapor condensation, such as the case of the control volume assumed at FIGS. 7A and 7B.

For the case of no water vapor condensation, heat transfer from the flue gas is directly transferred to the tube wall temperature, $T_w$. The third governing equation is derived as shown in Equation (3.8).

$$\dot{m}_g \cdot c_{p,g} \cdot dT = h_g \cdot (T_g - T_w) \cdot dA \quad (3.8)$$

Equation (3.8) reflects energy conservation between the enthalpy change of flue gas side and the heat transfer rate from the flue gas side to the tube wall surface. Ordinary differential equation, Equation (3.8) is integrated for a discretized cell, which is presumably small enough to assume that the all other variables are constant.

$$\int_{T_{g,in}}^{T_{g,out}} \dot{m}_g \cdot c_{p,g} \cdot dT = \int h_g \cdot (T_g - T_w) \cdot dA$$

$$\dot{m}_g \cdot c_{p,g} \cdot \int_{T_{g,in}}^{T_{g,out}} dT = h_g \cdot (T_g - T_w) \cdot \int dA$$

$$\dot{m}_g \cdot c_{p,g} \cdot (T_{g,out} - T_{g,in}) = h_g \cdot (T_g - T_w) \cdot \Delta A_i$$

Using the relation that the parameter $T_g$ is an average value of $T_{g,in}$ and $T_{g,out}$, above equation can be expressed as below.

$$\dot{m}_g \cdot c_{p,g} \cdot (T_{g,out} - T_{g,in}) = h_g \cdot \left( \frac{T_{g,in} + T_{g,out}}{2} - T_w \right) \cdot \Delta A_i$$

An expression for exit flue gas temperature in the absence of water condensation can be obtained by using the flue gas energy balance equation, as following Equation (3.9).

$$T_{g,out} = \frac{\left( \dot{m}_g \cdot c_{p,g} - \frac{h_g}{2} \cdot \Delta A_i \right) \cdot T_{g,in} + h_g \cdot \Delta A_i \cdot T_w}{\dot{m}_g \cdot c_{p,g} + \frac{h_g}{2} \cdot \Delta A_i} \quad (3.9)$$

Equation (3.9) is used to calculate the exit gas temperature for the case of no water vapor condensation, such as the case of control volume assumed at FIG. 3.4.

Overall Energy Balance Equations

The overall energy balance equation is the governing equation for energy transfer from the flue gas to the cooling water. It can be derived by modification of the Colburn-Hougen Equation (3.4) since total heat transfer to the cooling water on the right hand side of Equation (3.4) is equal to the enthalpy change of the cooling water. The fourth governing equation is shown as follows.

$$[h_g \cdot (T_g - T_i) + h_{fg} \cdot k_m (y_{H_2O} - y_i)] \cdot dA = \dot{m}_c \cdot C_{P,c} \cdot dT_c \quad (3.10)$$

This ordinary differential equation, Equation (3.10) is integrated for a discretized cell, which is presumably small enough to assume that all other variables are constant.

$$\int_{T_{c,in}}^{T_{c,out}} \dot{m}_c \cdot C_{P,c} \cdot dT_c = \int [h_g \cdot (T_g - T_i) + h_{fg} \cdot k_m (y_{H_2O} - y_i)] \cdot dA$$

$$\dot{m}_c \cdot C_{P,c} \cdot \int_{T_{c,in}}^{T_{c,out}} dT_c = [h_g \cdot (T_g - T_i) + h_{fg} \cdot k_m (y_{H_2O} - y_i)] \cdot \int dA$$

$$\dot{m}_c \cdot C_{P,c} \cdot (T_{c,out} - T_{c,in}) = [h_g \cdot (T_g - T_i) + h_{fg} \cdot k_m (y_{H_2O} - y_i)] \cdot \Delta A_i$$

An expression for inlet cooling water temperature at condensation zone can be obtained by using the integrated result of overall energy balance equation.

$$T_{c,in} = T_{c,out} - \frac{[h_g \cdot (T_g - T_i) + h_{fg} \cdot k_m (y_{H_2O} - y_i)] \cdot \Delta A_i}{\dot{m}_c \cdot c_{P,c}} \quad (3.11)$$

Equation (3.11) can be used to calculate the inlet cooling water temperature for the cell in the presence of water vapor condensation, such as the case of control volume assumed at FIGS. 7A and 7B.

For the case of no condensation of water vapor, the interfacial temperature, $T_i$, in the first term of Equation (3.10) is replaced by tube wall temperature, $T_w$, and the mass transfer term is eliminated on the left hand side of Equation (3.10) since there is no condensate. The fifth governing equation is derived from Equation (3.10) as shown hereunder.

$$h_g (T_g - T_w) \cdot dA = \dot{m}_c \cdot C_{P,c} \cdot dT_c \quad (3.12)$$

This ordinary differential equation, Equation (3.12) is integrated for a discretized cell, which is presumably small enough to assume that the all other variables are constant.

$$\int h_g \cdot (T_g - T_w) \cdot dA = \int_{T_{c,in}}^{T_{c,out}} \dot{m}_c \cdot C_{P,c} \cdot dT$$

$$h_g \cdot (T_g - T_w) \cdot \int dA = \dot{m}_c \cdot c_{P,c} \cdot \int_{T_{c,in}}^{T_{c,out}} dT$$

$$h_g \cdot (T_g - T_w) \cdot \Delta A_i = \dot{m}_c \cdot c_{P,c} \cdot (T_{c,out} - T_{c,in})$$

An expression for inlet cooling water temperature in the case of no water condensation can be obtained by using the overall energy balance equation.

$$T_{c,in} = T_{c,out} - \frac{h_g \cdot (T_g - T_w) \cdot \Delta A_i}{\dot{m}_c \cdot c_{P,c}} \quad (3.13)$$

Equation (3.13) is used to calculate the inlet gas temperature for the case of no water vapor condensation.

Tube Wall Energy Balance Equation

The total heat transfer from flue gas is transferred to the tube wall, which is then transferred to the cooling water by convection heat transfer. This results in increased enthalpy of cooling water. The sixth governing equation is established by Equation (3.14), as follows.

$$h_c \cdot (T_w - T_c) \cdot dA = \dot{m}_c \cdot c_{P,c} \cdot dT_c \quad (3.14)$$

This ordinary differential equation, Equation (3.14) is integrated for a discretized cell, which is presumably small enough to assume that the all other variables are constant.

$$\int h_c \cdot (T_w - T_c) \cdot dA = \int_{T_{c,in}}^{T_{c,out}} \dot{m}_c \cdot C_{P,c} \cdot dT$$

$$h_c \cdot (T_w - T_c) \cdot \int dA = \dot{m}_c \cdot C_{P,c} \cdot \int_{T_{c,in}}^{T_{c,out}} dT$$

$$h_c \cdot (T_w - T_c) \cdot \Delta A_i = \dot{m}_c \cdot C_{P,c} \cdot (T_{c,out} - T_{c,in})$$

An expression for tube wall temperature can be obtained by using the integrated result of tube wall energy balance, as following Equation (3.15).

$$T_w = T_c + \frac{\dot{m}_c \cdot C_{P,c} \cdot (T_{c,out} - T_{c,in})}{h_c \cdot \Delta A_i} \quad (3.15)$$

Equation (3.15) is used to calculate the tube wall temperature for case of either water condensation or no water vapor condensation.

Assumptions and Simplifications

Analytical modeling for this method and system was developed with the following assumptions.

The flows are one dimensional.
Steady state is assumed.
Two phases (gases and liquids) are assumed for the flue gas side.
One phase flow is assumed for the cooling water side.
All properties are constant in a discretized cell: modeling will be carried out with a small enough cell so that constant properties are assured.
Film condensation occurs on the tube wall surface: condensation on the outer duct wall is neglected.

The thermal resistance due to the film is negligible since it contributes about 1-3 percent of total thermal resistance.

There is negligible thermal resistance due to the tube wall.

The tube arrangement is in-line.

There is no evaporation of water vapor or sulfuric acid.

There is no heat loss through the duct wall of the condensing heat exchanger.

There are no chemical reactions.

The critical Reynolds number for turbulent transition on the cooling water side is 2300.

There is fully developed flow in the case of turbulent flow.

The chemical composition of flue gas is: $H_2O(g)$, $H_2O(l)$, $CO_2(g)$, $O_2(g)$, $N_2(g)$, $H_2SO_4(g)$, and $H_2SO_4(l)$.

The chemical composition of condensates is $H_2O(l)$ and $H_2SO_4(l)$.

The chemical composition on the cooling water side is $H_2O(l)$.

Simplifications for analytical modeling are additionally needed, as follows:

One multiple bend tube in a tube bank is simplified to be a long straight tube which has the same length as the multiple bend tube, and The chemical composition of flue gas at the inlet is assumed as follows,

TABLE 3.1

Chemical composition of flue gas at inlet [vol % dry]

| Chemical Species | #6 oil | Natural Gas | Coal |
|---|---|---|---|
| $CO_2$ (g) | 14.0 | 10.8 | 15.0 |
| $O_2$ (g) | 2.9 | 2.5 | 3.7 |
| $N_2$ (g) | 83.1 | 86.7 | 81.3 |

Heat Transfer Coefficient for Flue Gas Side

To predict the convective heat transfer coefficient on the flue gas side of a bare tube bank, Zukauskas proposed an empirical correlation, $$\overline{Nu_D} = C \cdot Re_{D,max}^m \cdot Pr^{0.36} \cdot \left(\frac{Pr}{Pr_s}\right)^{1/4} \quad (3.16)$$

$$\begin{bmatrix} 0.7 \leq Pr \leq 500 \\ 1000 \leq Re_{D,max} \leq 2 \times 10^6 \end{bmatrix}$$

where all properties except $Pr_s$ are evaluated at the arithmetic mean of the fluid inlet and outlet temperatures and constants C and m are listed in Table 3.2.

TABLE 3.2

Constants for heat transfer coefficient on the flue gas side

| Configuration | $Re_{D,max}$ | C | m |
|---|---|---|---|
| Aligned ($S_T/S_L > 0.7$) | $10^3 - 2 \times 10^5$ | 0.27 | 0.63 |
| Staggered ($S_T/S_L > 0.7$) | $10^3 - 2 \times 10^5$ | $0.35(S_T/S_L)^{1/5}$ | 0.60 |
| Staggered ($S_T/S_L > 0.7$) | $10^3 - 2 \times 10^5$ | 0.4 | 0.60 |
| Aligned | $2 \times 10^5 - 2 \times 10^6$ | 0.021 | 0.84 |
| Staggered | $2 \times 10^5 - 2 \times 10^6$ | 0.022 | 0.84 |

Constants are selected according to specific configuration and Reynolds number. The Reynolds number appearing in Equation (3.16) is based on the maximum velocity $V_{g,max}$; that is the velocity of wet flue gas passing through the duct area blocked by tubes ($A_{gap}$).

$$V_{g,max} = \frac{\dot{m}}{\rho \cdot A_{gap}} \quad (3.17)$$

Briggs and Young developed an empirical correlation for heat transfer for air flowing over a bank of integral-fin-tubing. Their correlation is used for the finned tube modeling:

$$\frac{h_g \cdot k_g}{D_r} = 0.1507 Re^{2/3} Pr^{1/3} \left(\frac{s}{l}\right)^{0.164} \left(\frac{s}{t}\right)^{0.075} \quad (3.18)$$

Use of Equation (3.18) neglects the effect of condensate film thickness on finned tubes. Modeling results suggest that this assumption is reasonable. Configuration of finned tube for both this study and Briggs and Young's study are listed and compared as shown in FIG. 8 to check applicability. FIG. 8 shows the comparison for conditions applied to correlation.

Heat Transfer Coefficient for Cooling Water Side

For laminar flow, a thermal entry length solution is used to predict a convective heat transfer coefficient on the cooling water side. Non-dimensional entry length $x^+$ is defined as follows.

$$x^+ = \frac{2x/D_i}{Re_D \cdot Pr} \quad (3.19)$$

In Equation (3.19), x is the axial distance from the point where heat transfer starts in the cooling water tube. In the case of laminar flow, for multiple bend tubes, the thermal entry length begins wherever the cooling water flows out from a U-bend section. Multiple bend tubes make the cooling water follow several u-turns since it consists of repeated tubing with a straight tube and a u-tube.

The variable x is assumed to be equivalent length of the straight tube of a multiple bend tube. This assumption results in higher heat transfer coefficient than that of the long straight tube. Values for Nusselt numbers in the circular tube with constant surface temperature are summarized in Table 3.4.

TABLE 3.4

Nusselt numbers for the circular tube

| x+ | $Nu_x$ | $Nu_m$ |
|---|---|---|
| 0 | ∞ | ∞ |
| 0.001 | 12.80 | 19.29 |
| 0.004 | 8.03 | 12.09 |
| 0.01 | 6.00 | 8.92 |
| 0.04 | 4.17 | 5.81 |
| 0.08 | 3.77 | 4.86 |
| 0.10 | 3.71 | 4.64 |
| 0.20 | 3.66 | 4.15 |
| ∞ | 3.66 | 3.66 |

For a turbulent flow, one correlation, which is valid over a large Reynolds number range including the transition region, is provided by Gnielinski:

$$Nu_D = \frac{(f/8)(ReD - 1000)Pr}{1 + 12.7(f/8)^{1/2}(Pr^{2/3} - 1)} \quad (3.20)$$

$$0.5 \leq Pr \leq 2000$$

$$3000 \leq Re_D \leq 5 \times 10^6$$

Equation (3.20) can be applied for case of both uniform surface heat flux and constant tube wall temperature, and properties should be evaluated at the mean temperature. The friction factor in Equation (3.20) can be obtained from the Moody diagram, or, for smooth tubes, from Equation (3.21) & (3.22). Equation (3.21) can be used for the lower Reynolds number range and Equation (3.22) is used for larger Reynolds numbers.

$$f = 0.316 \, Re_D^{-1/4}$$

$$Re_D \leq 2 \times 10^4 \quad (3.21)$$

$$f = (0.790 \ln Re_D - 1.64)^{-2}$$

$$3000 \leq Re_D \leq 5 \times 10^6 \quad (3.22)$$

Mass Transfer Coefficient for Water Vapor Condensation

An equation to express the relationship between mass diffusion and heat transfer is obtained by the Lewis relation, since heat and mass transfer mechanisms are analogous. The Colburn j factors for heat and mass transfer are defined as:

$$j_H = St \cdot Pr^{2/3} = \frac{h}{\rho \cdot c_p \cdot V} \cdot Pr^{2/3} \quad (3.23)$$

$$0.6 < Pr < 60$$

$$j_m = St_m \cdot Sc^{2/3} = \frac{h_D}{V}(Sc)^{2/3} \quad (3.24)$$

$$0.6 < Sc < 3000$$

The Lewis analogy requires equating Equation (3.23) and (3.24), that is, $j_H = j_m$. Then an expression is derived for the mass transfer coefficient, $h_D$, as a function of the heat transfer coefficient, $h_g$.

$$h_D = \frac{h_g}{\rho \cdot c_{p,g} \cdot Le_{H_2O-gas}^{2/3}} \quad (3.25)$$

The mass transfer rate in terms of mass concentration is calculated from;

$$\dot{m}_{cd} = h_D \cdot (C_{ab} - C_{ai}) \cdot A_a \quad (3.26)$$

The molar transfer rate in terms of partial pressure is calculated from;

$$\dot{n}_{cd} = k^*_m \cdot (P_{ab} - P_{ai}) \cdot A_a \quad (3.27)$$

If ideal gas behavior is assumed for the condensing vapor, then mass concentration of species a is defined as;

$$C_a = \frac{\rho \cdot M_a \cdot P_a}{M_g \cdot P_g} \quad (3.28)$$

where $P_g$ is the logarithmic mean pressure of the non-diffusing gas between the free stream and the wall and is defined as:

$$P_g = \frac{P_{nb} - P_{ni}}{\ln(P_{nb}/P_{ni})} \quad (3.29)$$

Substitution of (3.28) into (3.26) yields;

$$\dot{m}_{cd} = \frac{h_D \cdot \rho \cdot M_a}{M_g \cdot P_g}(C_{ab} - C_{ai}) \cdot A_a \quad (3.30)$$

Converting (3.30) to molar units results in;

$$\dot{n}_{cd} = \frac{h_D \cdot \rho}{M_g \cdot P_g}(C_{ab} - C_{ai}) \cdot A_o \quad (3.31)$$

By equating (3.31) to (3.27), an expression for $k^*_m$ is derived;

$$k^*_m = \frac{h_D \cdot \rho}{M_g \cdot P_g} \quad (3.32)$$

Substitution of (3.25) into (3.32) provides the desired expression for the mass transfer coefficient:

$$k^*_m = \frac{h_g}{c_{p,g} \cdot M_g \cdot P_g \cdot Le_{H_2O-gas}^{2/3}} \quad (3.33)$$

Rewriting Equation (3.27) using Equation (3.33), $$\dot{n}_{cd} = \frac{h_g}{c_{p,g} \cdot M_g \cdot P_g \cdot Le_{H_2O-gas}^{2/3}} \cdot (P_{ab} - P_{ai}) \cdot A_a \quad (3.34)$$

To convert the molar transfer rate into the mass transfer rate, the molecular mass of water is multiplied on the both sides, then $$\dot{m}_{cd} = \frac{h_g \cdot M_{H_2O}}{c_{p,g} \cdot M_g \cdot P_g \cdot Le_{H_2O-gas}^{2/3}} \cdot (P_{ab} - P_{ai}) \cdot A_a \quad (3.35)$$

Rewriting Equation (3.35) to convert the variables of partial pressure into mole fraction using the total pressure, $P_{tot}$, $$\dot{m}_{cd} = \frac{h_g \cdot M_{H_2O}}{c_{p,g} \cdot M_g \cdot P_g \cdot Le_{H_2O-gas}^{2/3}} \cdot P_{tot} \cdot (P_{ab} - P_{ai}) \cdot \frac{1}{P_{tot}} \cdot A_a \quad (3.36)$$

$$= \frac{h_g \cdot M_{H_2O}}{c_{p,g} \cdot M_g \cdot P_g \cdot Le_{H_2O-gas}^{2/3}} \cdot (y_{ab} - y_{ai}) \cdot A_a$$

where $y_{lm}$, is the logarithmic mean mole fraction of the non-diffusing gas between the free stream and the wall:

$$y_{lm} = \frac{P_g}{P_{tot}} = \frac{y_{ni} - y_{nb}}{\ln(y_{ni}/y_{nb})} \quad (3.37)$$

where $y_{ni}$ and $y_{nb}$ are the mole fractions of non-condensable at the interface and at the bulk, respectively. The parameter $P_g$ is shown in Equation (3.29)

The final form of mass transfer coefficient is obtained:

$$k_m = \frac{h_g \cdot M_{H_2O}}{c_{p,g} \cdot M_g \cdot y_{lm} \cdot Le_{H_2O\text{-}gas}^{2/3}} \quad (3.38)$$

All properties are calculated based on mixture properties except molecular mass of water and the log mean mole fraction of non-condensable gases between flue gas and wall. The parameter $Le_{H_2O\text{-}gas}$ is the Lewis number of water vapor, in which $D_{H_2O\text{-}gas}$ is the mass diffusion coefficient of water vapor in flue gas.

$$Le_{H_2O\text{-}gas} = \frac{Sc}{Pr} = \frac{\alpha_g}{D_{H_2O\text{-}gas}} \quad (3.39)$$

It is considered that a strong correlation exists between the thermal and mass diffusivities. The mass diffusivity of water vapor in flue gas was estimated with the well-known mass diffusivity of water vapor in air as, $$D_{H_2O\text{-}gas} = D_{H_2O\text{-}air}\left(\frac{\alpha_g}{\alpha_{air}}\right) \quad (3.40)$$

where $\alpha_g$ and $\alpha_{air}$ are the thermal diffusivities of flue gas and air, respectively. The diffusivity of water vapor in air can be expressed as:

$$D_{H_2O\text{-}air} = 7.65 \times 10^{-5} \frac{(T+273.15)^{11/6}}{P} \quad (3.41)$$

where T is in °C., P is in Pa and $D_{H2O\text{-}air}$ is in m²/s.

Interfacial Mole Fraction of Water Vapor

The interfacial mole fraction is the mole fraction of water vapor at the interface between flue gas and liquid film of water on the tube surface. The interfacial mole fraction of water vapor can be calculated by the Antoine equation, Equation (3.42):

$$y_i = \frac{\exp\left(a - \frac{b}{T_i + c}\right)}{P_{tot}} \quad (3.42)$$

$a = 16.262$ $b = 3799.89$ $c = 226.35$ where $y_i$ is interfacial mole fraction of water vapor in vol % wet (volumetric fraction at wet basis), Ti is interfacial temperature in °C. and $P_{tot}$ is in kPa.

Condensation Rate of Water Vapor

Condensation rate of water vapor is proportional to the concentration driving forces in the vapor phase and can be calculated by integration of the following ordinary differential equation:

$$d\dot{m}_{cd} = k_m \cdot (y_{H_2O} - y_i) \cdot dA \quad (3.43)$$

where $y_{H2O}$ and $y_i$ are the mole fraction of water vapor at the bulk of flue gas and the interface, respectively, and dA is the differential of area.

Reynolds Number & Fluid Velocity

As shown in Equation (3.44), the Reynolds number on the flue gas side is calculated using the mixture density ($\rho_g$), flue gas maximum velocity passing through the tube gap ($V_{g,max}$), outer diameter of cooling water tube ($D_O$), and viscosity of mixture ($\mu_g$). Gap velocity of flue gas is the maximum velocity between the tubes and duct.

$$Re_{D,g} = \frac{\rho_g \cdot V_{g,max} \cdot D_O}{\mu_g} \quad (3.44)$$

Gap area is calculated by subtracting the area blocked by tube bank from the duct cross-sectional area. Gap velocity of flue gas is calculated using Equation (3.17) and (3.45):

$$A_{gap} = A_{duct} - A_{blocked} \quad (3.45)$$

where $A_{duct}$ is the cross-sectional area of the rectangular duct and $A_{blocked}$ is the blocked area which is occupied by tubes in the duct cross-section. The gap area ratio is the ratio of blocked area to duct area as shown in Equation (3.46).

$$\delta_{gap} = \frac{A_{blocked}}{A_{duct}} \quad (3.46)$$

A higher gap area ratio means a larger cross-sectional area occupied by tubes. A tube configuration having a higher gap area ratio is expected to have a higher maximum flue gas velocity between tubes.

The Reynolds number on the cooling water side is based on density of water ($\rho_c$), average velocity of water inside the tube ($V_c$), inner diameter of cooling water tube ($D_i$), and viscosity of water ($\mu_c$), as shown in Equation (3.47).

$$Re_{D,c} = \frac{\rho_c \cdot V_c \cdot D_i}{\mu_c} \quad (3.47)$$

Velocity of cooling water and cross-sectional area of tube are calculated as shown in Equation (3.48) and (3.49).

$$V_c = \frac{\dot{m}_c}{\rho_c \cdot A_c} \quad (3.48)$$

$$A_c = \frac{\pi}{4} D_i^2 \quad (3.49)$$

Dew Point Temperature of Sulfuric Acid

Verhoff and Banchero performed a detailed investigation to obtain a correlation for predicting the acid dew point of flue gas. The equation which reflects a least squares fit of their experimental data is presented below:

$$\frac{1}{T_{dew,H_2SO_4}} = 0.002276 - 0.00002934 \cdot \ln(P_{H_2O}) - \qquad (3.50)$$
$$0.0000858 \cdot \ln(P_{H_2SO_4}) + 6.2 \times 10^{-6} \cdot \{\ln(P_{H_2O}) \cdot \ln(P_{H_2SO_4})\}$$

where $T_{dew,H_2SO_4}$ is the dew point temperature of sulfuric acid in degree Kelvin, $P_{H_2O}$ and $P_{H_2SO_4}$ are partial pressures of water vapor and sulfuric acid, respectively, in mmHg.

Interfacial Mole Fraction of Sulfuric Acid

Equation (3.50) can be inverted to yield an expression for mole fraction of sulfuric acid at the interface, $y_{i,H2SO4}$ corresponding to a given interfacial temperature of water vapor, $T_{i,H2O}$, and a partial pressure of water vapor at the interface, $P_{i,H2O}$. The equation for interfacial mole fraction of sulfuric acid is expressed by Equation (3.51):

$$y_{i,H_2SO_4} = \exp\left[\frac{\frac{1}{T_{i,H_2O}} - 0.002276 + 0.00002943 \cdot \ln(P_{i,H_2O})}{6.20 \times 10^{-6} \cdot \ln(P_{i,H_2O}) - 0.0000858}\right] / P_{tot} \qquad (3.51)$$

where $y_{i,H2SO4}$ is in vol % wet, $T_{i,H2O}$ is in degree Kelvin, $P_{i,H2O}$ and $P_{tot}$ are in mmHg.

Mass Transfer Coefficient for Sulfuric Acid Condensation

Mass transfer coefficient for sulfuric acid condensation is derived as Equation (3.52):

$$k_{m,H_2SO_4} = \frac{h_g \cdot M_{H_2SO_4}}{C_{p,g} \cdot M_g \cdot y_{lm} \cdot Le_{H_2SO_4 \text{-} gas}^{2/3}} \qquad (3.52)$$

The parameters $h_g$ and $C_{p,g}$ are the heat transfer coefficient and the specific heat of wet flue gas side, respectively. The parameters $M_{H_2SO_4}$ and $M_g$ are the molecular weight of sulfuric acid and wet flue gas mixture, respectively. The parameter $y_{lm}$ is the logarithmic mean mole fraction of the non-condensable gas between the free stream and the wall, as shown in Equation (3.37). The parameter $Le_{H_2SO_4\text{-}gas}$ is the Lewis number of sulfuric acid, in which $D_{H_2SO_4\text{-}gas}$ is the mass diffusion coefficient of sulfuric acid in flue gas.

$$Le_{H_2SO_4\text{-}gas} = \frac{Sc}{Pr} = \frac{\alpha_g}{D_{H_2SO_4\text{-}gas}} \qquad (3.53)$$

The mass diffusivity of sulfuric acid in flue gas was estimated with the well-known mass diffusivity of water vapor in air as, $$D_{H_2SO_4\text{-}gas} = D_{H_2SO_4\text{-}air}\left(\frac{\alpha_g}{\alpha_{air}}\right) \qquad (3.54)$$

where $\alpha_g$ and $\alpha_{air}$ are the thermal diffusivities of flue gas and air, respectively. The diffusivity of sulfuric acid in air can be expressed as:

$$D_{H_2SO_4\text{-}air} = 5.0032 \cdot 10^{-6} + 1.04 \times 10^{-8} \cdot T + 1.64 \times 10^{-11} \cdot T^2 - 1.566 \times 10^{-14} \cdot T^3 \qquad (3.55)$$

where T is in Kelvin and $D_{H2SO4\text{-}air}$ is in m²/s. Calculated representative values of thermal diffusivity and mass diffusivity for water vapor and sulfuric acid in flue gas are listed in Table 3.5. Measured mass diffusivity of water vapor in air at 76.7° F. and one atmosphere is 1.01 ft²/h and measured mass diffusivity of sulfuric acid in $N_2$ at 76.7° F. and one atmosphere is 0.364 ft²/h. The effective diffusivity at humidified condition is reported to be less than without the presence of water vapor. The Lewis number for water vapor is approximately one. The diffusion properties of sulfuric acid vapor are known with much less certainty than those for water. Land (1977) used a value of 2.33 for Le, with an uncertainty of ±30%.

TABLE 3.5

Calculated properties of water vapor and sulfuric acid at 76.7° F.

|  | Water vapor | Sulfuric acid |
| --- | --- | --- |
| Thermal diffusivity ($\alpha$) [ft²/h] | 0.7595 | 0.7595 |
| Mass diffusivity ($D$) [ft²/h] | 0.9905 | 0.3540 |
| Le | 0.77 | 2.15 |

Condensation Rate of Sulfuric Acid

Condensation rate of sulfuric acid is proportional to the concentration driving forces in the vapor phase and can be calculated by integration of the following ordinary differential equation, Equation (3.56):

$$d\dot{m}_{cd,H_2SO_4} = k_{m,H_2SO_4} \cdot (y_{H_2SO_4} - y_{i,H_2SO_4}) \cdot dA \qquad (3.56)$$

where the parameter $d\dot{m}_{cd}$ is the condensation rate of sulfuric acid and the parameter $k_{m,H_2SO_4}$ is the mass transfer coefficient of sulfuric acid. The parameters $y_{H_2SO_4}$ and $y_{i,H_2SO_4}$ are the mole fractions of sulfuric acid in flue gas and interface, respectively.

Numerical Scheme

In order to develop an analytical modeling for heat and mass transfer in a condensing heat exchanger, the system and method solves all variables expressed at FIGS. 7A and 7B using an appropriate numerical scheme. The numerical scheme employed is an iterative solution procedure which iterates the loop until reasonable agreement between calculated and target values of variables is obtained.

Assuming a countercurrent and cross flow condensing heat exchanger which has multiple tube bends in the duct. Flue gas is flowing into the duct and cooling water flows inside the tubes in a direction opposite to the flue gas flow. The schematic for overall control volume of a pilot scale condensing heat exchanger taken into account in this study is illustrated at FIG. 9.

As shown in FIG. 9, one configuration provides 5 stages of heat exchangers connected in series. Such a configuration includes several given variables: inlet flue gas temperature, inlet flue gas flow rate, inlet cooling water temperature, cooling water flow rate, and inlet mole fraction of water vapor. A simplified numerical scheme for modeling the condensing heat exchanger shown is illustrated at FIG. 10.

The system and method of the present invention proposes that the given inlet cooling water temperature is fixed as a target value and serves as the criterion for convergence. In order to calculate inlet cooling water temperature, a value for the exit cooling water temperature is initially assumed on the flue gas inlet side. The control volume is discretized with piecewise cells for a one dimensional finite difference method.

The solution procedure consists of an inner loop for calculations of necessary variables and an outer loop for iteration control. The inner loop begins with assumption of exit cooling water temperature and calculates variables such as the unknown temperatures and the heat and mass transfer coefficients of each cell. After one iteration of the inner loop, the calculated inlet cooling water temperature at the last cell is compared with the target value which is a given inlet cooling water temperature. If it does not coincide, the outer loop adjusts and updates the exit cooling water temperature. The inner loop is started over with the newly assumed value of exit cooling water temperature. The outer loop iterates until the calculated inlet cooling water temperature coincides with the target value within reasonable accuracy.

For better confidence level, total condensation rate is added to the convergence criteria. In this case, iteration of the solution procedure is terminated only when both the inlet cooling water temperature and total condensation rate converge within an acceptable range. FIG. 11 shows the detailed logic for the iterative solution procedure.

In discretizing the total heat transfer surface area to apply a one dimensional finite difference method, forward differencing was used. The trapezoidal rule was applied for numerical integration.

Operation of the Condensing Heat Exchanger

The method and system improves the operation of the condensing heat exchanger. The method and system predicts the amount of condensation under the current operating conditions of the heat exchanger. The system and method determines the effect of the flow rate and the temperature of the coolant will have on condensing the water and acid. The operator can vary the flow rate of the coolant or the temperature of the coolant to control the amount of condensation. The system provides a cost analysis of the flow rate and varying the temperature of the coolant.

By increasing the cooling effect, the heat exchanger increases the amount of condensation of both water and acid. Increasing the cooling effect increases the costs of operating the heat exchanger and the power plant. The system determines the rate of condensation and the costs of changing the cooling effect. In some instances, the costs will be slight to greatly increase the condensation rate. The costs may be great in other instances to vary the condensation rate. The system provides such analysis to cost effectively manage the cooling effect and the condensation rate.

The system may alert an operator to increase the cooling effect by increasing the flow rate of the coolant. In another embodiment, the system may automatically increase the flow rate of the coolant to increase condensation. The system may also decrease the temperature of the coolant to increase condensation at the condensing heat exchanger. Increasing condensation of the flue gas increases the amount of water available at the power plant and decreases the amount of acid within the flue gas.

The system and method also predicts the condensation of the acid from the flue gas. Acids, including sulfuric acid, condense on the heat exchanger. To limit the amount of acid released from the flue gas, the system and method may modify the operating conditions of the heat exchanger. If the condensing heat exchanger is not condensing a sufficient amount of acid, an alarm or other alert system may activate a warning to alert an operator that an insufficient amount of acid is condensing at the heat exchanger. The method and system may also increase the flow rate of the coolant to increase condensation of the acid at the heat exchanger. The system may also decrease the temperature of the coolant to increase condensation at the condensing heat exchanger.

Sizing of the Condensing Heat Exchanger

The method and system also models the operation of the condensing heat exchanger in the operating conditions of the plant. Such modelling enables the power plant to install the appropriate heat exchanger at the plant. The method and system can inform the user of locations at which the acid will condense on the condensing surfaces of the heat exchanger. The method and system also informs the user of the size of the heat exchanger needed and the load required by the plant.

The amount of acid condensate varies throughout the heat exchanger. To combat the corrosion caused by the sulfuric acid, the surfaces at which the acid condensate occur are treated with an anti-corrosive coating such as a polymer, Teflon, corrosive resistant coating, or other anti-corrosive. However, the acid does not occur on all condensing surfaces of the heat exchanger. The system and method analyzes the amount of acid condensation that occurs through the condensing heat exchanger. Knowing the locations and amounts of acid condensate throughout the condensing heat exchanger provides the user with information as to the locations at which the anti-corrosive coating should be applied. The operators of the power plant may then design a heat exchanger customized to work in the operating environment of the plant. By reducing the amount of coating applied, the user can save costs by reducing the amount of coating applied to those condensing surfaces at which acid condensation will not occur.

The method and system also determines the effectiveness of a heat exchanger in a specific operating condition. Such determination enables the plant to install the most effective heat exchanger for the operating conditions. The plant can avoid installing a heat exchanger that will not function properly. The plant can also reduce costs of a heat exchanger that is too large for the plant. Therefore, the method and system determines the heat exchangers designed specifically for the environment in which the heat exchanger will be installed.

Ash Fouling and Ash Deposition

The present invention also provides predictive modeling for transient ash deposition in post boiler heat exchangers and ash fouling on superheater and reheater in boiler. Due to increased operation costs, some power plants operate using low-rank or blending coals. The use of such coals causes quick growth of slagging/sintering/fouling deposits. The increase thermal resistance caused by the deposits deteriorates the heat transfer rate in cooling or heating which leads to abnormal operation. Thus, the power plant deviates from the power plant design conditions. The ash deposits negatively impact the performance of the power plant equipment. The ash deposits cause inefficient operation and low productivity. The ash deposits also increase difficulties and problems with operation and maintenance of the power plant and equipment. The corrosion layers shorten the lifetime of the plant equipment. Therefore, the ash deposition may result in deteriorating overall performance and cost of power plant.

The system and method indicates the areas at which the ash depositions will occur and the levels of ash deposition. The operator can then vary the operating conditions of the heat exchanger to reduce the ash depositions. Such reduced operations increases operation and effectiveness of the power plant. The user can also increase the lifetime of the power plant equipment.

The system and method also determines the effect of water and acid condensation within the heat exchanger caused by the ash deposition. The user can establish the cooling effect to properly manage the condensation of water and acid while considering the ash deposition.

The system and method can also modify the areas at which condensation of water and acid will occur. The system and method spatially predict the locations at which condensation will occur. The user may modify the characteristics of the heat exchanger by changing temperature of the cooling water, the flow rate of the cooling water, tube design, internal temperatures, etc. Such changes to the operation and design of the heat exchanger modify the condensation rate and the locations at which the condensation occur. The user can then modify collection points of the heat exchanger to collect the condensation. The user can also modify the placement of coating on the heat exchanger to resist corrosion caused by the condensation. Such changes improve the life of the heat exchanger and decrease downtime caused by such problems.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for operating a condensing heat exchanger in a power plant that produces flue gas, the system controlling a rate of condensation of water and acid from the flue gas by the condensing heat exchanger, the system comprising:
   said condensing heat exchanger through which the flue gas passes;
   a water inlet at which cooling water enters the condensing heat exchanger, the cooling water having an inlet water temperature;
   a flue gas inlet at which the flue gas enters the condensing heat exchanger;
   a flow rate at which the cooling water passes through the condensing heat exchanger;
   a first temperature measuring device that measures a temperature of the cooling water;
   a second temperature measuring device that measures a temperature of the flue gas;
   a computer calculating the rate of condensation of the flue gas within the condensing heat exchanger from the temperature of the flue gas and the temperature of the cooling water, wherein the computer determines that the rate of condensation does not meet a desired rate of condensation;
   a cooler applying a cooling effect to the cooling water to decrease the inlet water temperature of the cooling water passing through the condensing heat exchanger, the computer instructing the cooler to increase the cooling effect on the cooling water to a lower temperature to increase condensation as a result of the computer determining that the rate of condensation does not meet a desired rate of condensation.

2. The system of claim 1 wherein the flow rate of the cooling water through the condensing heat exchanger increases to increase the condensation.

3. The system of claim 2 further comprising:
   a pump that pumps the cooling water through the condensing heat exchanger;
   the computer instructing the pump to increase the flow rate of the cooling water through the condensing heat exchanger.

4. The system of claim 1 further comprising:
   the cooler decreasing the temperature of the cooling water travelling through the condensing heat exchanger;
   a coolant flowing through the cooler that cools the cooling water, wherein the flow rate of the coolant through the cooler increases when the desired rate of condensation is not met to increase the cooling effect of the cooler;
   the computer instructing the cooler to increase the cooling effect on the cooling water to increase the condensation when the desired rate of condensation is not met.

5. The system of claim 1 further comprising:
   a cooling tube of the condensing heat exchanger through which the cooling water flows;
   the computer identifying the locations at which the acid condenses on the cooling tube;
   a coating applied to the cooling tube to limit corrosion of the cooling tube wherein the computer identifies locations not to apply the coating on the cooling tube.

6. The system of claim 1 wherein the computer identifies the rate of condensation of water within the condensing heat exchanger;
   a cooling tube of the condensing heat exchanger through which the cooling water flows;
   the computer identifying variables of the cooling tube that affect condensation of the water from the flue gas on the cooling tube;
   the cooling tube configured to increase condensation of the water from the flue gas by altering at least one of the variables identified by the computer.

7. The system of claim 6 wherein the cooling tube further comprises:
   a bend of the cooling tube;
   the computer identifying the number of bends to maximize the efficiency of the condensing heat exchanger for condensation.

8. The system of claim 1 further comprising:
   a cooling tube of the condensing heat exchanger through which the cooling water flows;
   the computer identifying variables of the cooling tube that affect condensation of the acid from the flue gas on the cooling tube;
   the computer identifying the rate of acid condensation occurring due to the variables of the cooling tube;
   the computer activating an alarm indicating that a minimum rate of acid condensation is not met by the cooling tube.

9. The system of claim 1 further comprising:
   a cooling tube of the condensing heat exchanger through which the cooling water flows;
   the computer identifying an inlet flue gas temperature at the flue gas inlet;
   the computer identifying an inlet cooling water temperature at the water inlet;
   the computer identifying a tube wall temperature of the cooling tube;
   the computer identifying the amount of condensation on the cooling tube;
   the computer instructing the cooler to increase the cooling effect of the cooler to reduce the temperature of the cooling water at the water inlet to increase the condensation.

10. The system of claim 9 wherein the computer instructs a pump to increase the flow rate of the cooling water to increase condensation.

11. The system of claim 9 wherein the computer instructs the cooler to decrease the temperature of the cooling water at the water inlet;
a computer calculating a mass flow rate of cooling water at an inlet of the condensing heat exchanger and a mass flow rate of wet flue gas at the flue gas inlet from the measured water temperature and the measured temperature of the flue gas, wherein the computer determines that a ratio of the mass flow rate of the cooling water compared to the mass flow rate of the wet flue gas does not meet a desired mass flow ratio;
the computer instructing the cooler to increase the cooling effect on the cooling water to increase the ratio of the mass flow rate of the cooling water compared to the mass flow rate of the wet flue gas to meet the desired mass flow ratio;
a coolant flowing through the cooler that cools the cooling water, wherein the computer increases the flow rate of the coolant through the cooler when the desired mass flow ratio is not met.

12. A system for operating a condensing heat exchanger in a power plant that produces flue gas, the system controlling a rate of condensation of water and acid from the flue gas by the condensing heat exchanger, the system comprising:
said condensing heat exchanger through which the flue gas passes;
a water inlet at which cooling water enters the condensing heat exchanger, the cooling water having an inlet water temperature at the water inlet;
a flue gas inlet at which the flue gas enters the condensing heat exchanger;
a flow rate at which the cooling water passes through the condensing heat exchanger;
a first temperature measuring device that measures the inlet water temperature of the cooling water;
a second temperature measuring device that measures a temperature of the flue gas at the flue gas inlet;
a computer calculating the rate of condensation of the flue gas within the condensing heat exchanger from the measured temperature of the flue gas and the measured inlet water temperature of the cooling water, wherein the computer determines that the rate of condensation does not meet a desired rate of condensation;
the system decreasing the inlet water temperature of the cooling water passing through the condensing heat exchanger to increase condensation;
a cooler through which the cooling water flows, the cooler applying a cooling effect to the cooling water to decrease the inlet water temperature of the cooling water prior to the cooling water flowing through the water inlet; and
the computer instructing the cooler to increase the cooling effect of the cooler on the cooling water to increase the rate of condensation.

13. The system of claim 12 further comprising:
the computer identifying an inlet flue gas temperature at the flue gas inlet;
the computer identifying an inlet cooling water temperature at the water inlet;
the computer identifying a tube wall temperature of the cooling tube;
the computer identifying the amount of condensation on the cooling tube;
the computer modifying a variable concerning the cooling water to increase the condensation.

14. The system of claim 13 further comprising: a pump that pumps the cooling water through the condensing heat exchanger; a cooling tube of the heat exchanger through which the cooling water flows, the computer instructing the pump to increase the flow rate of the cooling water through the cooling tube.

15. The system of claim 13 further comprising:
the cooler decreasing the temperature of the cooling water through the condensing heat exchanger;
the computer instructing the cooler to increase the cooling effect on the cooling water to cool the cooling water when the desired rate of condensation is not met;
a coolant flowing through the cooler that cools the cooling water, wherein the computer increases the flow rate of the coolant through the cooler when the desired rate of condensation is not met.

16. The system of claim 14 further comprising:
the computer identifying the locations at which the acid condenses on the cooling tube;
a coating applied to the cooling tube to limit corrosion of the cooling tube wherein the computer identifies locations not to apply the coating on the cooling tube.

17. The system of claim 14 further comprising:
the computer identifying the rate of acid condensation occurring due to the variables of the cooling tube;
the computer activating an alarm indicating that a minimum rate of acid condensation is not met by the cooling tube.

18. A system for operating a condensing heat exchanger in a power plant that produces flue gas, the system controlling a rate of condensation of water and acid from the flue gas by the condensing heat exchanger, the system comprising:
said condensing heat exchanger through which the flue gas passes; a water inlet at which cooling water enters the condensing heat exchanger, the cooling water having an inlet water temperature at the water inlet; a flue gas inlet at which the flue gas enters the condensing heat exchanger; a flow rate at which the cooling water passes through the condensing heat exchanger; a first temperature measuring device that measures the inlet water temperature of the cooling water; a second temperature measuring device that measures a temperature of the flue gas at the flue gas inlet; a computer calculating a mass flow rate of cooling water at an inlet of the condensing heat exchanger and a mass flow rate of wet flue gas at the flue gas inlet from the measured inlet water temperature and the measured temperature of the flue gas, wherein the computer determines that a ratio of the mass flow rate of the cooling water compared to the mass flow rate of the wet flue gas does not meet a desired mass flow ratio; a cooler through which the cooling water flows, the cooler decreasing the inlet water temperature of the cooling water prior to the cooling water flowing through the water inlet; and the computer instructing the cooler to Increase the cooling effect of the cooler on the cooling water to increase the ratio of the mass flow rate of the cooling water compared to the mass flow rate of the wet flue gas.

19. The system of claim 18 further comprising: a pump that pumps the cooling water through the condensing heat exchanger; the computer instructing the pump to increase the flow rate of the cooling water through the cooling tube to increase the ratio of the mass flow rate of the cooling water compared to the mass flow rate of the wet flue gas.

20. The system of claim 18 further comprising:
the cooler decreasing the temperature of the cooling water through the condensing heat exchanger;
the computer instructing the cooler to increase a cooling effect to cool the cooling water to increase the condensation when the desired rate of condensation is not met;
a coolant flowing through the cooler that cools the cooling water, wherein the computer increases the flow rate of the coolant through the cooler when the desired rate of condensation is not met.

* * * * *